US008585455B1

(12) United States Patent
Cok

(10) Patent No.: US 8,585,455 B1
(45) Date of Patent: Nov. 19, 2013

(54) MAKING DISPLAY DEVICE WITH PIXEL-ALIGNED GROUND MICRO-WIRE

(71) Applicant: Ronald Steven Cok, Rochester, NY (US)

(72) Inventor: Ronald Steven Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/626,924

(22) Filed: Sep. 26, 2012

(51) Int. Cl.
*G06F 3/044* (2006.01)
*G06F 3/041* (2006.01)
*H01J 1/62* (2006.01)

(52) U.S. Cl.
USPC ............... 445/24; 445/25; 345/173; 345/174; 345/156; 313/503; 313/506

(58) Field of Classification Search
CPC ..... G06F 3/44; G06F 3/0416; H01L 51/5206; H01L 27/3244
USPC .......................... 345/173, 174; 313/506, 507; 445/24–25; 216/16
See application file for complete search history.

(56) References Cited

U.S. PATENT DOCUMENTS

| | | |
|---|---|---|
| 3,223,525 A | 12/1965 | Hendrik |
| 6,645,444 B2 | 11/2003 | Goldstein |
| 6,812,637 B2 | 11/2004 | Cok et al. |
| 7,663,607 B2 | 2/2010 | Hotelling et al. |
| 2006/0057502 A1 | 3/2006 | Okada et al. |
| 2010/0026664 A1 | 2/2010 | Geaghan |
| 2010/0302201 A1 | 12/2010 | Ritter et al. |
| 2011/0007011 A1 | 1/2011 | Mozdzyn |
| 2011/0099805 A1 | 5/2011 | Lee |
| 2011/0289771 A1 | 12/2011 | Kuriki |
| 2011/0291966 A1 | 12/2011 | Takao et al. |
| 2012/0031746 A1 | 2/2012 | Hwang et al. |
| 2012/0162116 A1 | 6/2012 | Philipp |

OTHER PUBLICATIONS

U.S. Appl. No. 13/406,649, filed Feb. 28, 2012, Cok.

*Primary Examiner* — Tracie Y Green
(74) *Attorney, Agent, or Firm* — Raymond L. Owens

(57) ABSTRACT

A method of making a display device includes providing a display substrate having an array of pixels formed in rows and columns. The rows of pixels are separated by row inter-pixel gaps and the columns of pixels are separated by column inter-pixel gaps. The method further includes providing a transparent dielectric layer located over the display substrate, the transparent dielectric layer having a row side and an opposed column side. Row electrodes spaced apart by row inter-electrode gaps are provided on the row side of the transparent dielectric layer and column electrodes spaced apart by column inter-electrode gaps are provided on the column side of the transparent dielectric layer, the row and column electrodes separated by the transparent dielectric layer. Ground lines are provided between neighboring row electrodes in the row inter-electrode gaps and between the pixels in a row inter-pixel gap.

21 Claims, 22 Drawing Sheets

MAKING DISPLAY DEVICE WITH PIXEL-ALIGNED GROUND MICRO-WIRE

CROSS REFERENCE TO RELATED APPLICATIONS

Reference is made to commonly assigned U.S. patent application Ser. No. 13/587,185 filed Aug. 16, 2012, entitled "Making Display Device With Pixel-Aligned Micro-Wire Electrode" by Ronald S. Cok.

Reference is made to commonly assigned U.S. patent application Ser. No. 13/626,914 filed Sep. 26, 2012, entitled "Pixel-Aligned Ground Micro-Wire Device" by Ronald S. Cok; and U.S. patent application Ser. No. 13/626,917 filed Sep. 26, 2012, entitled "Display Apparatus With Pixel-Aligned Ground Micro-Wire" by Ronald S. Cok, the disclosures of which are incorporated herein.

FIELD OF THE INVENTION

The present invention relates to micro-wire ground lines incorporated into capacitive touch-screen displays.

BACKGROUND OF THE INVENTION

Transparent conductors are widely used in the flat-panel display industry to form electrodes that are used to electrically switch light-emitting or light-transmitting properties of a display pixel, for example in liquid crystal or organic light-emitting diode displays. Transparent conductive electrodes are also used in touch screens in conjunction with displays. In such applications, the transparency and conductivity of the transparent electrodes are important attributes so that they do not inhibit the visibility of the displays. In general, it is desired that transparent conductors have a high transparency (for example, greater than 90% in the visible spectrum) and a low electrical resistivity (for example, less than 10 ohms/square).

Touch screens with transparent electrodes are widely used with electronic displays, especially for mobile electronic devices. Such devices typically include a touch screen mounted over an electronic display that displays interactive information. Touch screens mounted over a display device are largely transparent so a user can view displayed information through the touch-screen and readily locate a point on the touch-screen to touch and thereby indicate the information relevant to the touch. By physically touching, or nearly touching, the touch screen in a location associated with particular information, a user can indicate an interest, selection, or desired manipulation of the associated particular information. The touch screen detects the touch and then electronically interacts with a processor to indicate the touch and touch location. The processor can then associate the touch and touch location with displayed information to execute a programmed task associated with the information. For example, graphic elements in a computer-driven graphic user interface are selected or manipulated with a touch screen mounted on a display that displays the graphic user interface.

Touch screens use a variety of technologies, including resistive, inductive, capacitive, acoustic, piezoelectric, and optical technologies. Such technologies and their application in combination with displays to provide interactive control of a processor and software program are well known in the art. Capacitive touch-screens are of at least two different types: self-capacitive and mutual-capacitive. Self-capacitive touch-screens employ an array of transparent electrodes, each of which in combination with a touching device (e.g. a finger or conductive stylus) forms a temporary capacitor whose capacitance is detected. Mutual-capacitive touch-screens can employ an array of transparent electrode pairs that form capacitors whose capacitance is affected by a conductive touching device. In either case, each capacitor in the array is tested to detect a touch and the physical location of the touch-detecting electrode in the touch-screen corresponds to the location of the touch. For example, U.S. Pat. No. 7,663,607 discloses a multipoint touch-screen having a transparent capacitive sensing medium configured to detect multiple touches or near touches that occur at the same time and at distinct locations in the plane of the touch panel and to produce distinct signals representative of the location of the touches on the plane of the touch panel for each of the multiple touches. The disclosure teaches both self- and mutual-capacitive touch-screens.

Referring to FIG. 16, a prior-art display and touch-screen apparatus 100 includes a display 110 with a corresponding touch screen 120 mounted with the display 110 so that information displayed on the display 110 is viewed through the touch screen 120. Graphic elements displayed on the display 110 are selected, indicated, or manipulated by touching a corresponding location on the touch screen 120. The touch screen 120 includes a first transparent substrate 122 with first transparent electrodes 130 formed in the x dimension on the first transparent substrate 122 and a second transparent substrate 126 with second transparent electrodes 132 formed in the y dimension facing the x-dimension first transparent electrodes 130 on the second transparent substrate 126. A transparent dielectric layer 124 is located between the first and second transparent substrates 122, 126 and first and second transparent electrodes 130, 132. Referring also to the plan view of FIG. 17, in this example, first pad areas 128 in the first transparent electrodes 130 are located adjacent to second pad areas 129 in the second transparent electrodes 132. (The first and second pad areas 128, 129 are separated into different parallel planes by the transparent dielectric layer 124.) The first and second transparent electrodes 130, 132 have a variable width and extend in orthogonal directions (for example as shown in U.S. Patent Application Publication Nos. 2011/0289771 and 2011/0099805). When a voltage is applied across the first and second transparent electrodes 130, 132, electric fields are formed between the first pad areas 128 of the x-dimension first transparent electrodes 130 and the second pad areas 129 of the y-dimension second transparent electrodes 132.

A display controller 142 (FIG. 16) connected through electrical buss connections 136 controls the display 110 in cooperation with a touch-screen controller 140. The touch-screen controller 140 is connected through electrical buss connections 136 and wires 134 and controls the touch screen 120. The touch-screen controller 140 detects touches on the touch screen 120 by sequentially electrically energizing and testing the x-dimension first and y-dimension second transparent electrodes 130, 132.

Referring to FIG. 18, in another prior-art embodiment, rectangular first and second transparent electrodes 130, 132 are arranged orthogonally on first and second transparent substrates 122, 126 with intervening transparent dielectric layer 124, forming touch screen 120 which, in combination with the display 110 forms the touch screen 120 and display apparatus 100. In this embodiment, first and second pad areas 128, 129 coincide and are formed where the first and second transparent electrodes 130, 132 overlap. The touch screen 120 and display 110 are controlled by touch screen and display controllers 140, 142, respectively, through electrical buss connections 136 and wires 134.

Since touch-screens are largely transparent so as not to inhibit the visibility of the displays over which the touch-screens are located, any electrically conductive materials located in the transparent portion of the touch-screen either employ transparent conductive materials or employ conductive elements that are too small to be readily resolved by the eye of a touch-screen user. Transparent conductive metal oxides are well known in the display and touch-screen industries and have a number of disadvantages, including limited transparency and conductivity and a tendency to crack under mechanical or environmental stress. This is particularly problematic for flexible touch-screen-and-display systems. Typical prior-art conductive electrode materials include conductive metal oxides such as indium tin oxide (ITO) or very thin layers of metal, for example silver or aluminum or metal alloys including silver or aluminum. These materials are coated, for example, by sputtering or vapor deposition, and are patterned on display or touch-screen substrates, such as glass. However, the current-carrying capacity of such electrodes is limited, thereby limiting the amount of power that can be supplied to the pixel elements. Moreover, the substrate materials are limited by the electrode material deposition process (e.g. sputtering). Thicker layers of metal oxides or metals increase conductivity but reduce the transparency of the electrodes.

Various methods of improving the conductivity of transparent conductors are taught in the prior art. For example, U.S. Pat. No. 6,812,637 describes an auxiliary electrode to improve the conductivity of the transparent electrode and enhance the current distribution. Such auxiliary electrodes are typically provided in areas that do not block light emission, e.g., as part of a black-matrix structure.

It is also known in the prior art to form conductive traces using nano-particles including, for example silver. The synthesis of such metallic nano-crystals is known. For example, U.S. Pat. No. 6,645,444 describes a process for forming metal nano-crystals optionally doped or alloyed with other metals. U.S. Patent Application Publication No. 2006/0057502 describes fine wirings made by drying a coated metal dispersion colloid into a metal-suspension film on a substrate, pattern-wise irradiating the metal-suspension film with a laser beam to aggregate metal nano-particles into larger conductive grains, removing non-irradiated metal nano-particles, and forming metallic wiring patterns from the conductive grains. However, such wires are not transparent and thus the number and size of the wires limits the substrate transparency as the overall conductivity of the wires increases.

Touch-screens, including very fine patterns of conductive elements, such as metal wires or conductive traces are known. For example, U.S. Patent Application Publication No. 2011/0007011 teaches a capacitive touch screen with a mesh electrode, as does U.S. Patent Application Publication No. 2010/0026664. Referring to FIG. 19, a prior-art x- or y-dimension variable-width first or second transparent electrode 130, 132 includes a micro-pattern 156 of micro-wires 150 arranged in a rectangular grid or mesh. The micro-wires 150 are multiple, very thin metal conductive traces or wires formed on the first and second transparent substrates 122, 126 (not shown in FIG. 19) to form the x- or y-dimension first or second transparent electrodes 130, 132. The micro-wires 150 are so narrow that they are not readily visible to a human observer, for example 1 to 10 microns wide. The micro-wires 150 are typically opaque and spaced apart, for example by 50 to 500 microns, so that the first or second transparent electrodes 130, 132 appear to be transparent and the micro-wires 150 are not distinguished by an observer.

It is known that micro-wire electrodes in a touch-screen can visibly interact with pixels in a display and various layout designs are disclosed to avoid such visible interaction. Furthermore, metal wires can reflect light, reducing the contrast of displays in which the metal wires are present. Thus, the pattern of micro-wires in a transparent electrode is important for optical as well as electrical reasons.

A variety of layout patterns are known for micro-wires used in transparent electrodes. U.S. Patent Application Publication 2010/0302201, U.S. Patent Application Publication No. 2012/0031746, U.S. Patent Application Publication No. 2012/0162116, and U.S. Patent Application Publication No. 2011/0291966 teach various micro-wire patterns used for electrodes in capacitive touch screens. FIG. 20 illustrates a prior-art example of first and second electrodes 130, 132 having micro-wires 150 arranged in a micro-pattern 156.

When in operation, electronic circuits such as those used to control arrays of pixels in a flat-screen display or to drive electrodes in a capacitive touch screen emit electromagnetic radiation that interferes with other nearby, electronic devices. For example, the signal lines and transistors that control the behavior of pixels in a flat-screen display emit electromagnetic radiation that can interfere with signals in a nearby touch screen. Likewise, the electrodes that are controlled to sense capacitance in a capacitive touch screen emit electromagnetic radiation that can interfere with signal lines and transistors in a nearby flat-screen display. Since touch screens and display devices are typically laminated together in a thin package, such interference can reduce the signal transmission rate or cause spurious signals in either or both of a laminated touch screen and display device.

There is a need, therefore, for an improved method and structure for reducing electromagnetic interference in a touch-screen-and-display device that does not reduce visibility of the display and is robust in the presence of mechanical stress.

SUMMARY OF THE INVENTION

In accordance with the present invention, a method of making a display device comprises:

providing a display substrate having an array of pixels formed in rows and columns, the rows of pixels separated by row inter-pixel gaps and the columns of pixels separated by column inter-pixel gaps;

providing a transparent dielectric layer located over the display substrate, the transparent dielectric layer having a row side and an opposed column side;

providing row electrodes spaced apart by row inter-electrode gaps located on the row side of the transparent dielectric layer and column electrodes spaced apart by column inter-electrode gaps located on the column side of the transparent dielectric layer, the row and column electrodes separated by the transparent dielectric layer; and providing ground lines located between neighboring row electrodes in the row inter-electrode gaps and between the pixels in a row inter-pixel gap.

The present invention provides a display-and-touch-screen device with reduced electromagnetic interference that preserves display visibility and provides mechanical flexibility. The use of micro-wires improves the contrast of the display-and-touch-screen device.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein.

The Figures are not drawn to scale since the variation in size of various elements in the Figures is too great to permit depiction to scale.

DETAILED DESCRIPTION OF THE INVENTION

Figure 1:
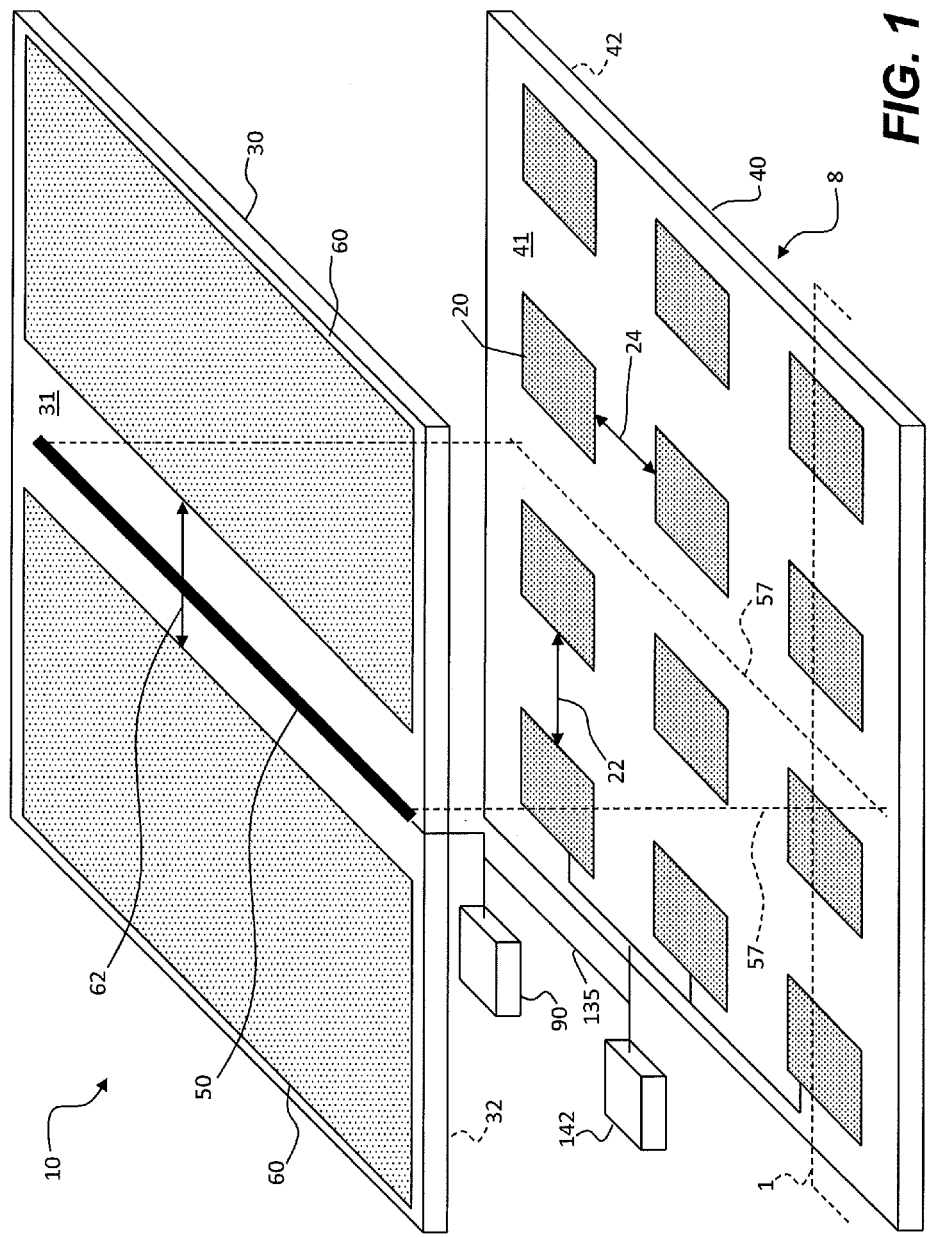
FIG. 1 is an exploded perspective of an embodiment of the present invention.

Referring to FIG. 1 in an embodiment of the present invention, a display device 10 includes a display 8 having an array of pixels 20. Pixels 20 are separated by column or row inter-pixel gaps 22, 24 in at least one dimension. In an embodiment, pixels 20 are separated by column inter-pixel gaps 22 between columns of pixels 20 and row inter-pixel gaps 24 between rows of pixels 20. Two or more column electrodes 60 are located over display 8 and extend across at least a portion of the array of pixels 20. Column electrodes 60 are separated by an inter-electrode gap 62. A column ground line 50 is located between column electrodes 60 in inter-electrode gap 62 and between pixels 20 in a column or row inter-pixel gap 22 or 24. To illustrate the location of column ground line 50, projection lines 57 show the projected location of column ground line 50 on display substrate 40 between pixels 20 in column or row inter-pixel gaps 22, 24. Column ground line 50 is an electrically conductive area on a substrate, for example a wire, metal trace, or other conductor and can have a high aspect ratio, that is, column ground line 50 is typically much longer than it is wide.

According to various embodiments of the present invention, column electrodes 60 and row electrodes 66 (shown in FIG. 10 and discussed below) are both electrodes, column inter-pixel gaps 22 and row inter-pixel gaps are both inter-pixel gaps, and column ground lines 50 and row ground lines 52 (shown in FIG. 10 and discussed below) are both ground lines. As will be appreciated by those knowledgeable in the art, row and column designations can be exchanged.

As illustrated in FIG. 1, column ground line 50 is located in a column inter-pixel gap 22. However, as is understood by those familiar with display design, rows and columns are arbitrary designations of dimensions in a two-dimensional array, such as the array of pixels 20, and can be interchanged. Thus, a ground line can be located within row inter-pixel gaps 24 simply by rotating either the arrangement of column electrodes 60 or the row and column designations of the array of pixels 20. The present invention includes such rotated arrangements and is not limited by the designations of row and column or horizontal or vertical directions.

The rows and column of pixels 20 illustrated in FIG. 1 are shown in straight lines. However, in other embodiments of the present invention, the rows and columns are arranged so that pixels 20 in rows or columns are offset with respect to each other so that rows or columns need not be straight. Likewise, electrode 60 and column ground line 50 are shown as straight, but need not be.

Displays 8 having pixels 20 can be formed on display substrates 40 using methods known in the art, for example with liquid crystal displays. Display substrates 40 can include a first display substrate side 41 on which pixels 20 are formed and a substantially parallel opposed second display substrate side 42. Likewise, column electrodes 60 or ground lines 50 can be formed on one, either, or both sides of an electrode substrate 30 having a first electrode substrate side 31 and an opposed second electrode substrate side 32 that can also be a transparent dielectric layer. Column or row electrodes 60, 66 or column or row ground lines 50, 52 can be made of transparent conductive materials such as indium tin oxide or micro-wires 55 (as discussed further below with reference to FIG. 9). Both materials and methods for designing, laying out, and forming such structures are known in the photolithographic arts.

In an embodiment, column or row ground lines 50, 52 are made of metal, metal particles, or metal alloys and are opaque. Because column or row ground lines 50, 52 are arranged between pixels 20 in column or row inter-pixel gaps 22, 24, light controlled by pixels 20 (e.g. by emitting, transmitting, or reflecting light) is not obscured or otherwise hindered by ground lines 50.

Figure 16:
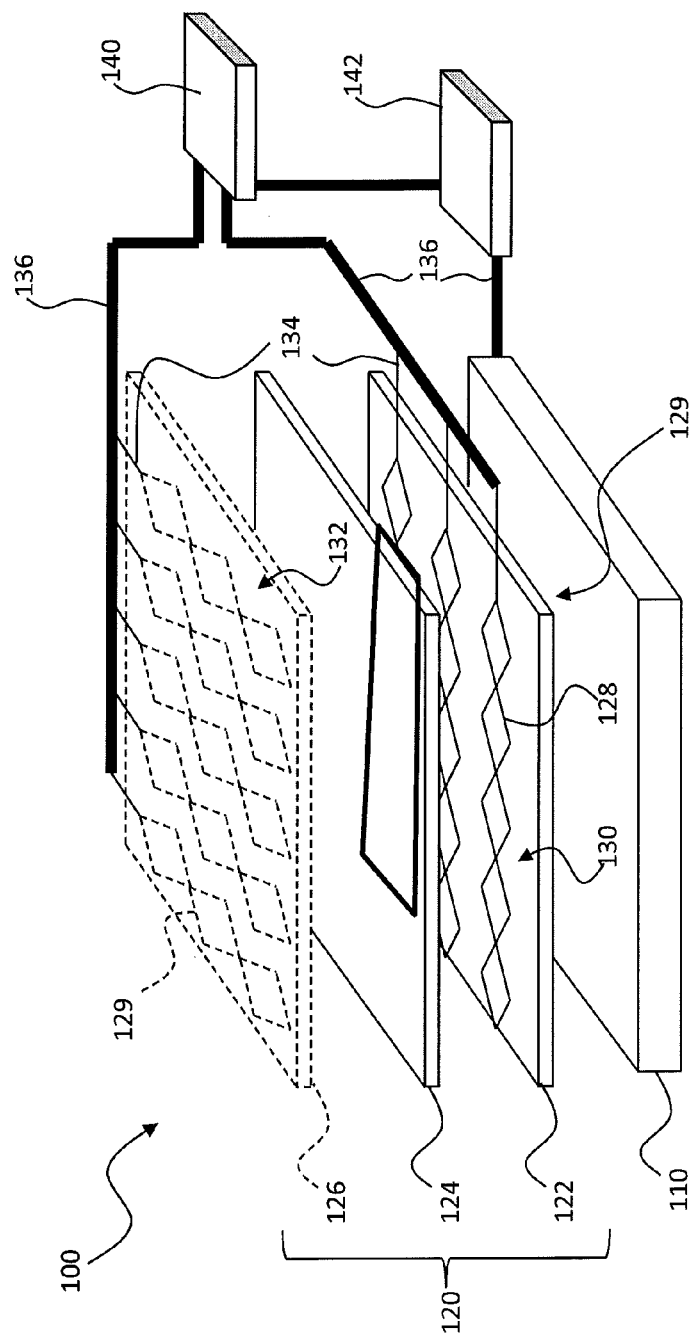
FIG. 16 is an exploded perspective illustrating a prior-art mutual capacitive touch screen having adjacent pad areas in conjunction with a display and controllers.
Figure 17:
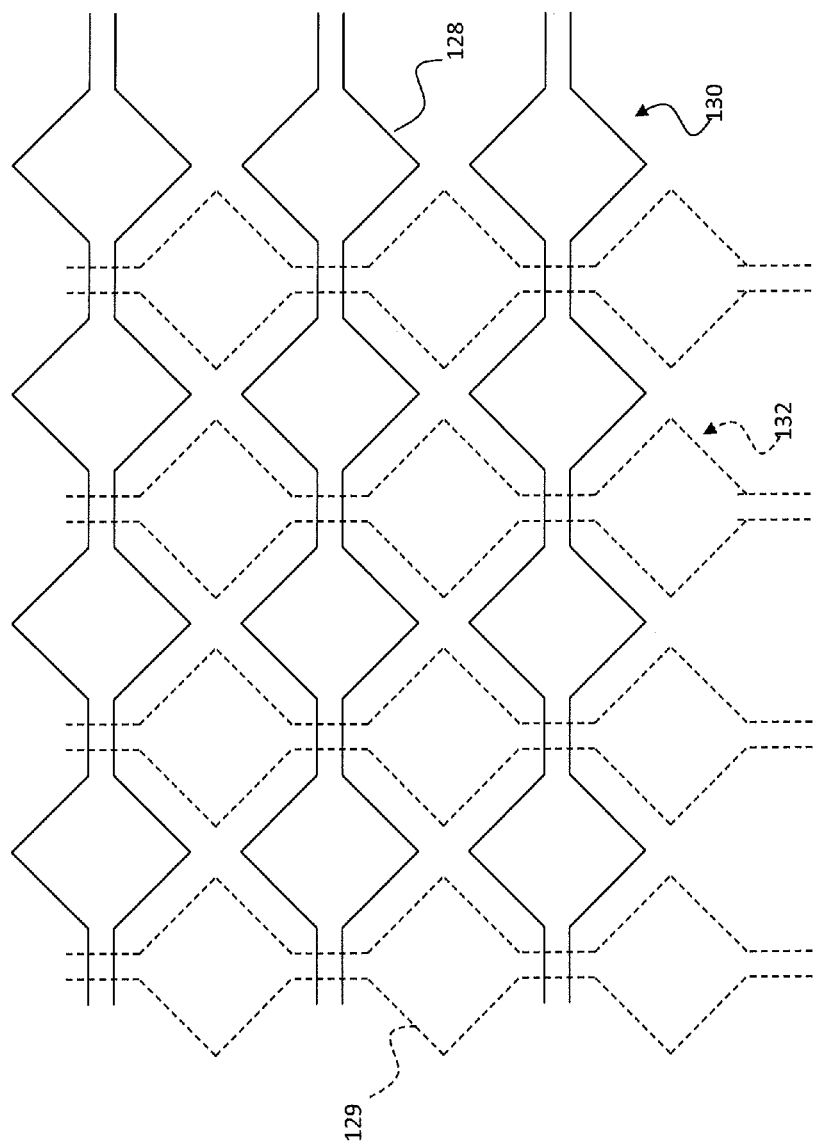
FIG. 17 is a schematic illustrating prior-art adjacent pad areas in a capacitive touch screen.

Pixels 20 of display 8 can be electrically controlled with electrical signals by a display controller 142. Similarly, column or row electrodes 60, 66 can be electrically controlled by an electrode control circuit 90 (for example as part of a touch-screen controller 140 as shown in FIG. 16). Display controller 142 can include a display ground and electrode control circuit 90 can include a circuit ground, both of which can be electrically connected to ground lines 50 by ground wires 135 so that they share a common ground connection. The use of grounds in electrical circuit design is well known in the art, as are circuits for controlling displays and for driving electrodes. Such circuits can be analog or digital, formed in integrated or discrete circuits and can include processors, logic arrays, programmable logic arrays, memories, and lookup tables and are well known. The design and layout of pixels 20 over display substrates 40 is commonplace in the display industry, as are the design and layout of column electrodes 60 over electrode substrates 30.

Figure 2:
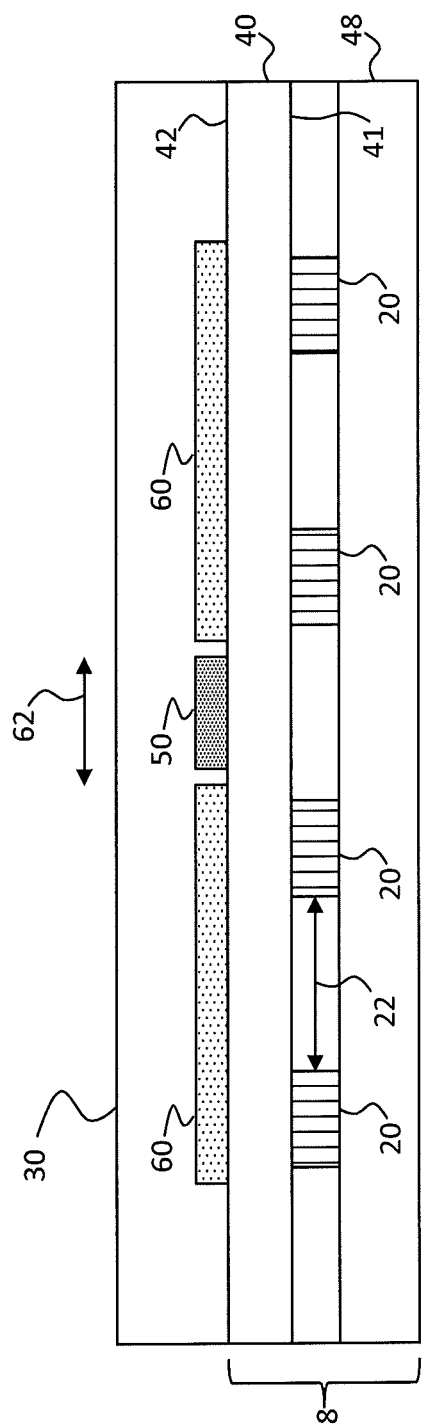
FIG. 2 is a cross section of the embodiment of FIG. 1.

Referring to the illustration of FIG. 2 taken along cross section line 1 of FIG. 1, in an embodiment of the present invention, display 8 is formed on display substrate 40 having first and opposing second display substrate sides 41, 42. Pixels 20 are formed on first display substrate side 41. Column electrodes 60 and column ground line 50 are formed on second display substrate side 42 or on layers formed on second display substrate side 42. Column inter-pixel gaps 22 and inter-electrode gap 62 are illustrated. Display substrate 40 is between column electrodes 60 and pixels 20. In this embodiment, therefore, display pixels 20 are formed on one side (first display substrate side 41) of display substrate 40 and column electrodes 60 and column ground lines 50 are formed on the opposite side (second display substrate side 42). Pixels 20 are protected by a display cover 48. Column electrodes 60 and column ground lines 50 are protected by electrode substrate 30. In other embodiments, column electrodes 60 and column ground lines 50 are protected by other protective materials or layers. In this configuration, display substrate 40 is between pixels 20 and column electrodes 60 and column ground line 50. As shown, column ground line 50 can substantially fill inter-electrode gap 62, for example within manufacturing tolerances for pixels 20, column electrodes 60, and column ground lines 50.

Figure 3:
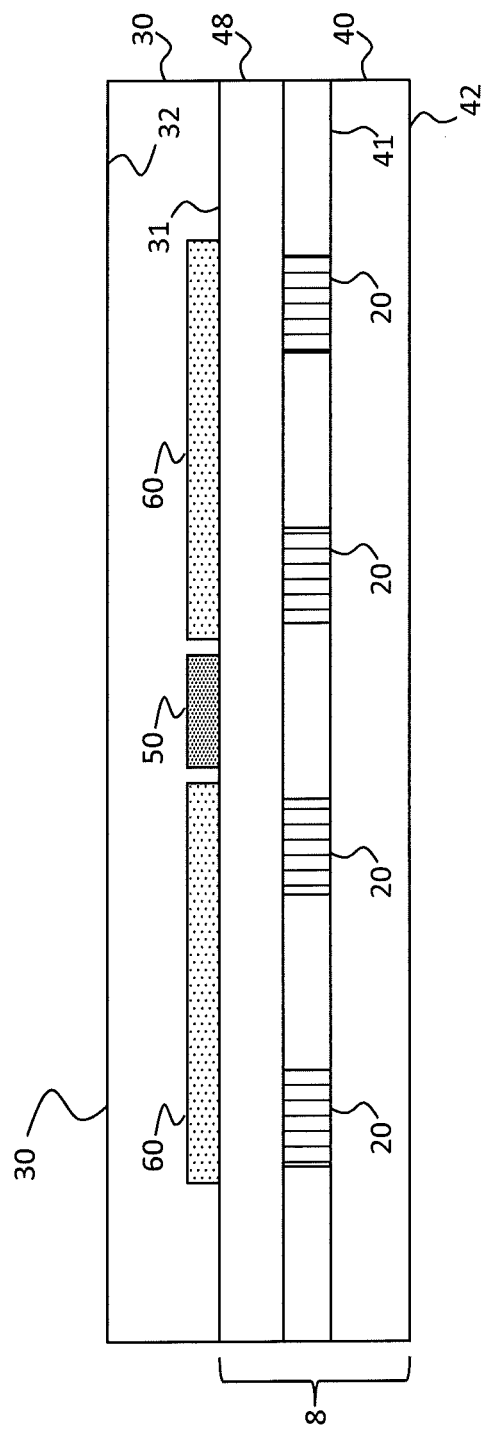
FIGS. 3-5 are cross sections of alternative embodiments of the present invention.

In an alternative embodiment, display pixels 20 are formed on the same side of display substrate 40 as column electrodes 60 and column ground line 50. Referring to FIG. 3, display 8 includes a display substrate 40 with opposing first and second display substrate sides 41 and 42. Pixels 20 are formed on first display substrate side 41. Display cover 48 protects pixels 20. Column electrodes 60 and column ground lines 50 are located over pixels 20 on the same side (first display substrate side 41) of display substrate 40. In an embodiment, column electrodes 60 and column ground lines 50 are formed directly on pixel cover 48 or layers formed on pixel cover 48. In another embodiment, column electrodes 60 and column ground lines 50 are formed on electrode substrate 30 or layers formed on electrode substrate 30 and display substrate 40 and electrode substrate 30 are laminated together. In this configuration, pixels 20 are between display substrate 40 and column electrodes 60 and column ground line 50, as is display cover 48. In an embodiment, display cover 48 is a separately provided substrate or a protective layer coated over pixels 20. If pixels 20 do not need a protective layer or otherwise incorporate their own protection (e.g. with an insulating or electrode layer), display cover 48 can be eliminated.

Figure 4:
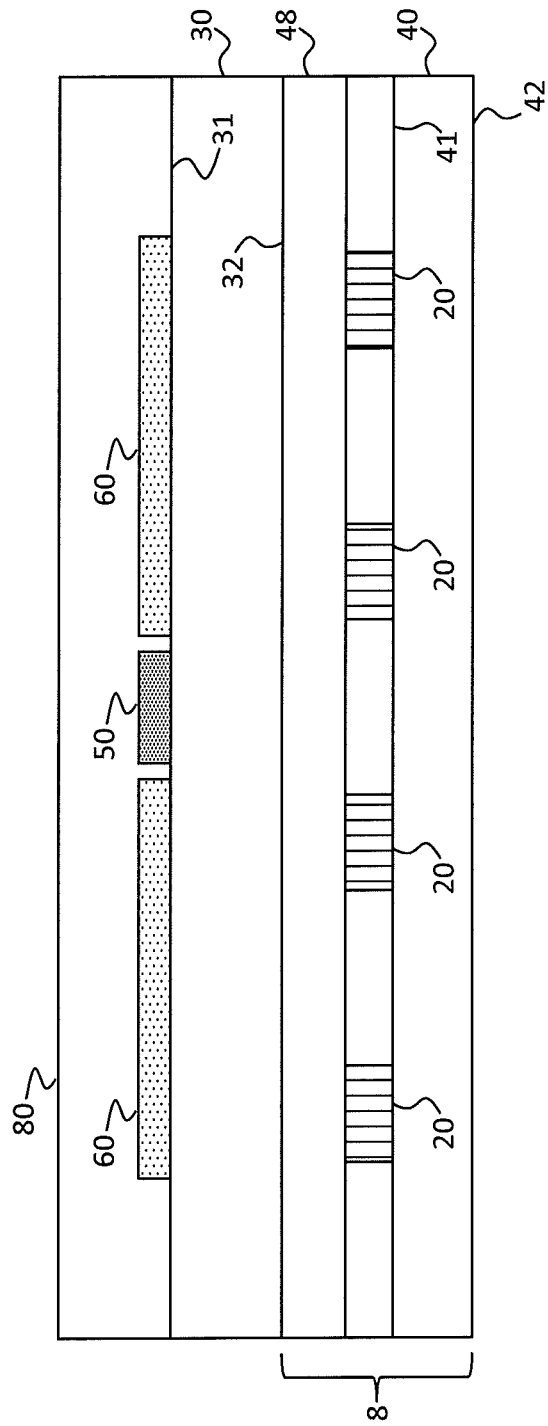

As shown in FIGS. 1 and 2, display device 10 can include electrode substrate 30. As shown in FIG. 3, electrode substrate 30 has a first electrode substrate side 31 and a substantially parallel second electrode substrate side 32 opposing first electrode substrate side 31. Electrode substrate 30 is a transparent dielectric layer. Column electrodes 60 and column ground line 50 are formed on first electrode substrate side 31 or on layers formed on first electrode substrate side 31 so that first electrode substrate side 31 is between electrode substrate 30 and display 8. In another embodiment, illustrated in FIG. 4, column electrodes 60 and column ground line 50 are formed on first electrode substrate side 31 or on layers formed on first electrode substrate side 31 but electrode substrate 30 is arranged so that second electrode substrate side 32 is between electrode substrate 30 and display 8. A protective layer 80 can protect column electrodes 60 and column ground line 50. Display 8, display substrate 40 having first and second display substrate sides 41, 42, display cover 48, and pixels 20 are as described with respect to FIG. 3.

Figure 5:
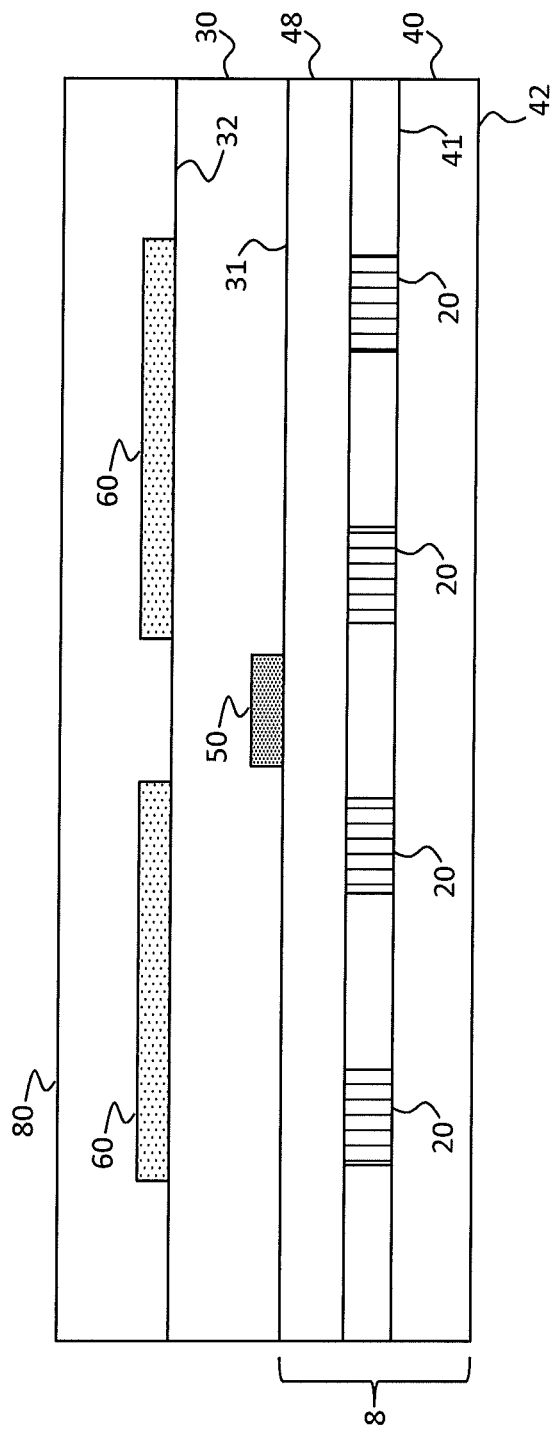

Alternatively, as shown in FIG. 5, column ground line 50 is formed on first electrode substrate side 31 or on layers formed on first electrode substrate side 31 and column electrodes 60 are formed on second electrode substrate side 32 or on layers formed on second electrode substrate side 32. Protective layer 80 protects the column electrodes 60. In this configuration, first electrode substrate side 31 is between electrode substrate 30 and display 8, as is column ground line 50 but not column electrodes 60.

Figure 6:
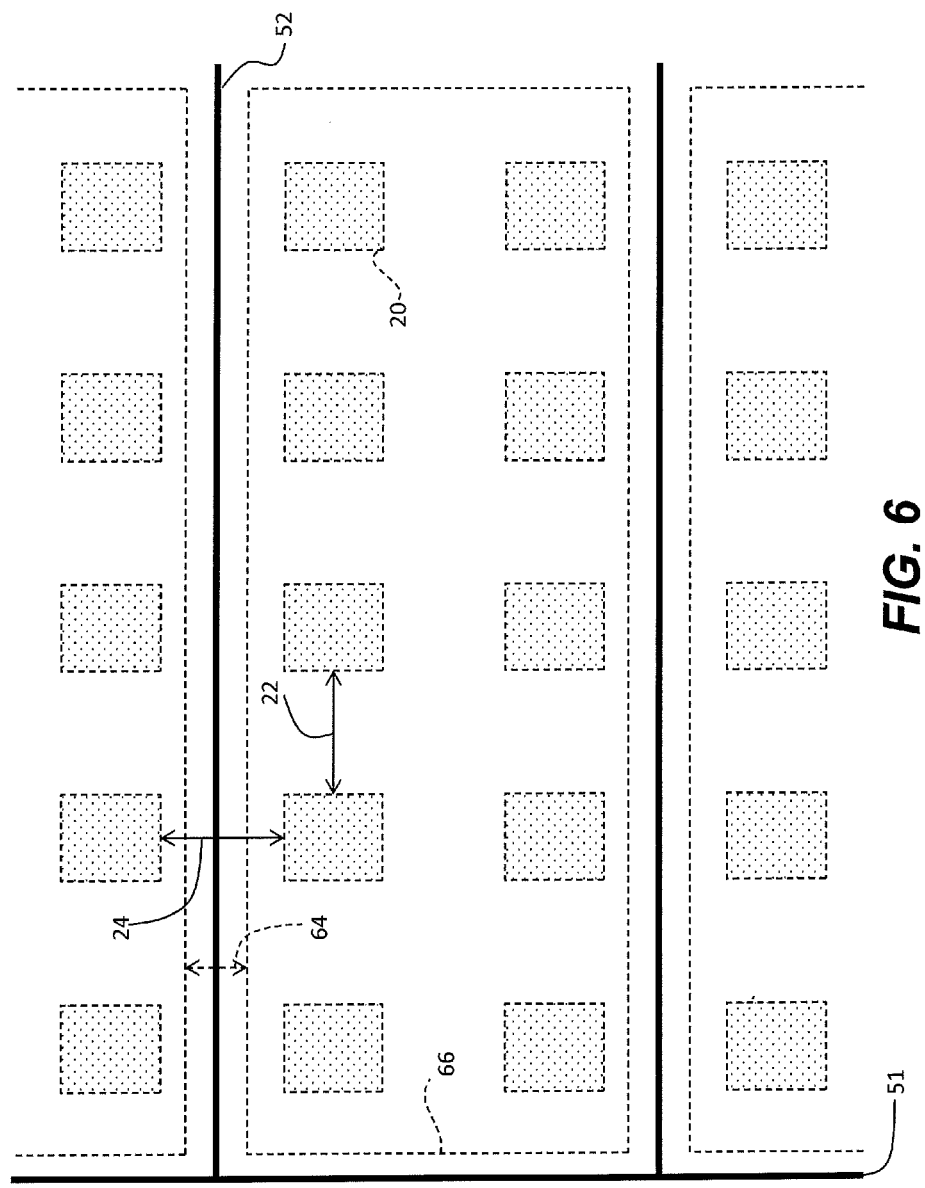
FIG. 6 is a plan view of an embodiment of the present invention.
Figure 7:
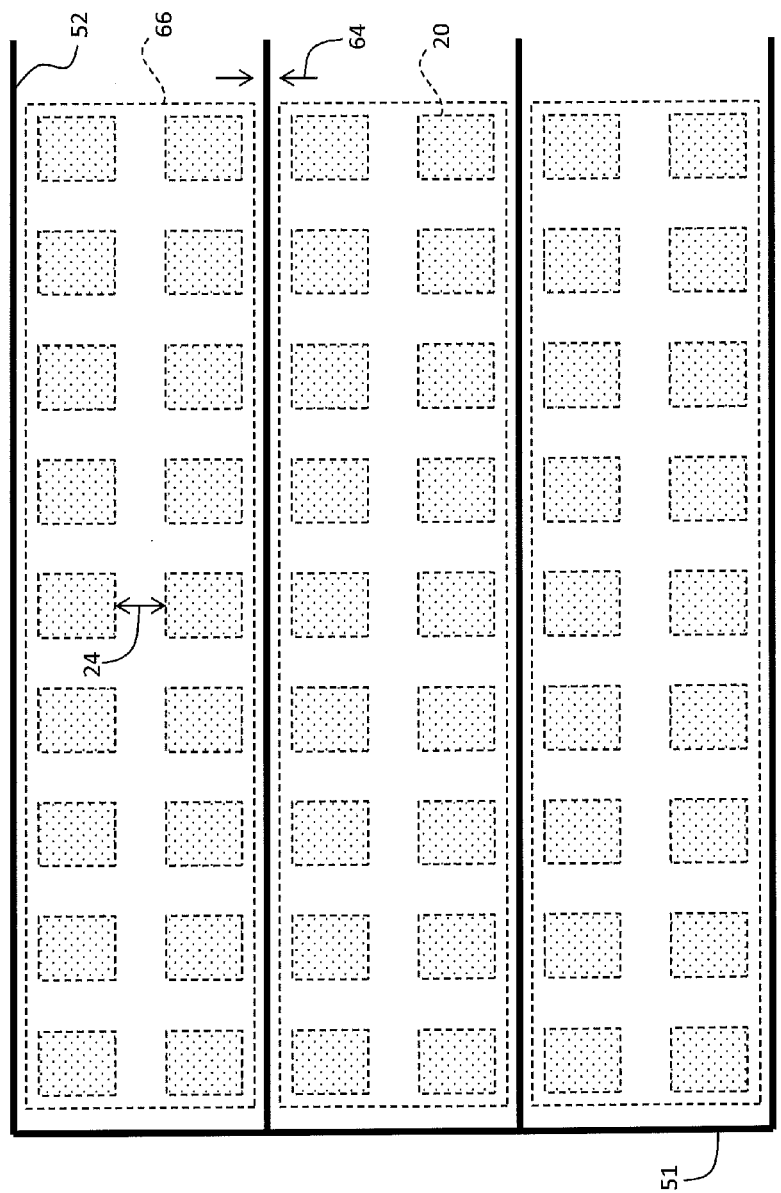
FIGS. 7 and 8 are plan views of row and column electrodes according to embodiments of the present invention.

Referring to FIG. 6, pixels 20 are arranged in rows and columns to form a two-dimensional array of pixels 20. The rows of pixels 20 are separated by row inter-pixel gaps 24 and the columns of pixels 20 are separated by column inter-pixel gaps 22. Row electrodes 66 each extend over a portion of the array of pixels 20 and are separated by row inter-electrode gaps 64. Row ground lines 52 are located between pixels 20 in row inter-pixel gaps 24 and within row inter-electrode gaps 64. Electrical connectors 51 electrically connect row ground lines 52 so that the row ground lines 52 are electrically connected in common. FIG. 7 illustrates row electrodes 66 with a larger array of pixels 20. Row ground lines 52 within row inter-electrode gaps 64 in row inter-pixel gaps 24 are electrically connected with electrical connector 51.

Figure 8:
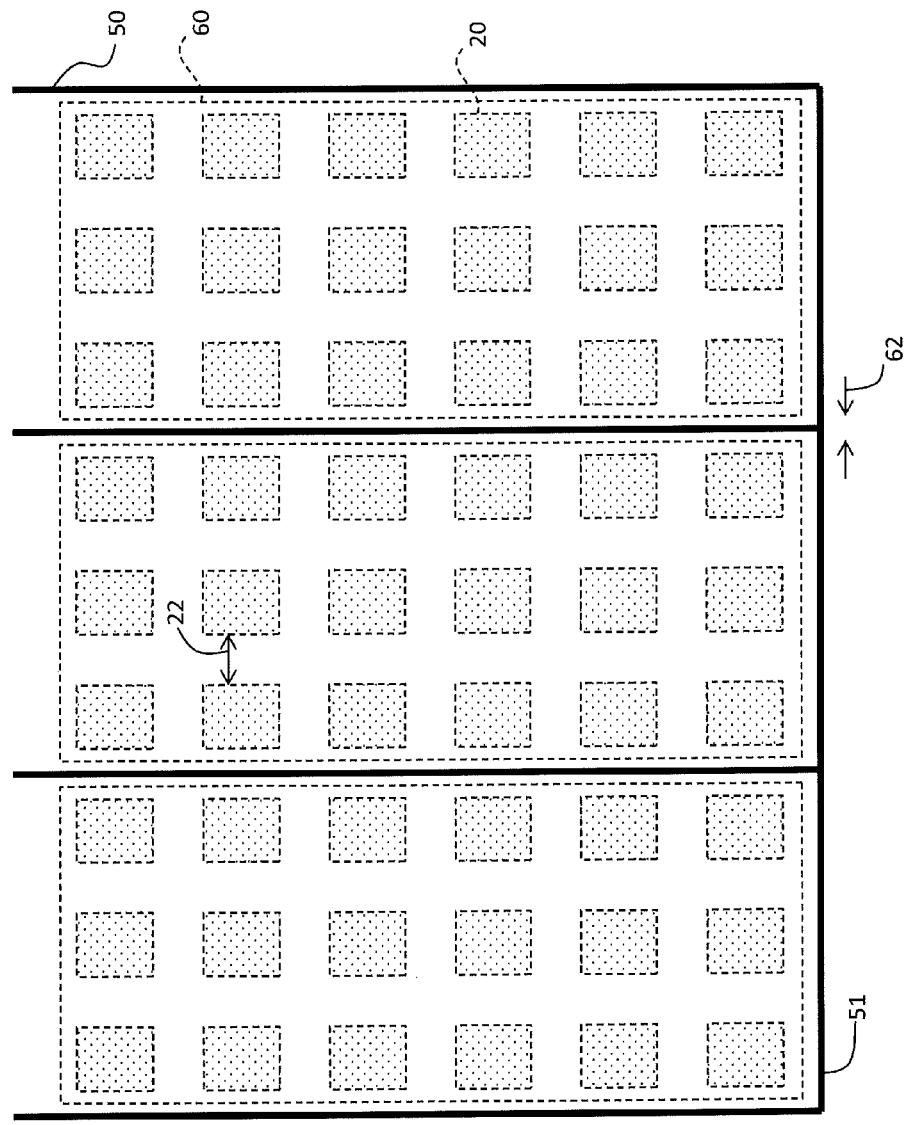

Referring to FIG. 8, column electrodes 60 each extend over a portion of the array of pixels 20 and are separated by column inter-electrode gaps 62. Column ground lines 50 are located between pixels 20 in column inter-pixel gaps 22 and within column inter-electrode gaps 62. Electrical connectors 51 electrically connect column ground lines 50 so that column ground lines 50 are electrically connected in common.

In an embodiment of the present invention, column ground line 50 includes metals or metal alloys and substantially fills inter-electrode gap 62, forming an opaque or reflective barrier. Column ground line 50 can be a straight line. In an alternative embodiment, referring to FIG. 9, row ground lines 52 located between row electrodes 66 and pixels 20 in row inter-electrode gaps 64 include electrically connected micro-wires 55 and are electrically connected with electrical connector 51. Micro-wires 55 do not necessarily fill row inter-electrode gap 64 and thus can be partially transparent. At least some of micro-wires 55 can form a straight line.

Figure 10:
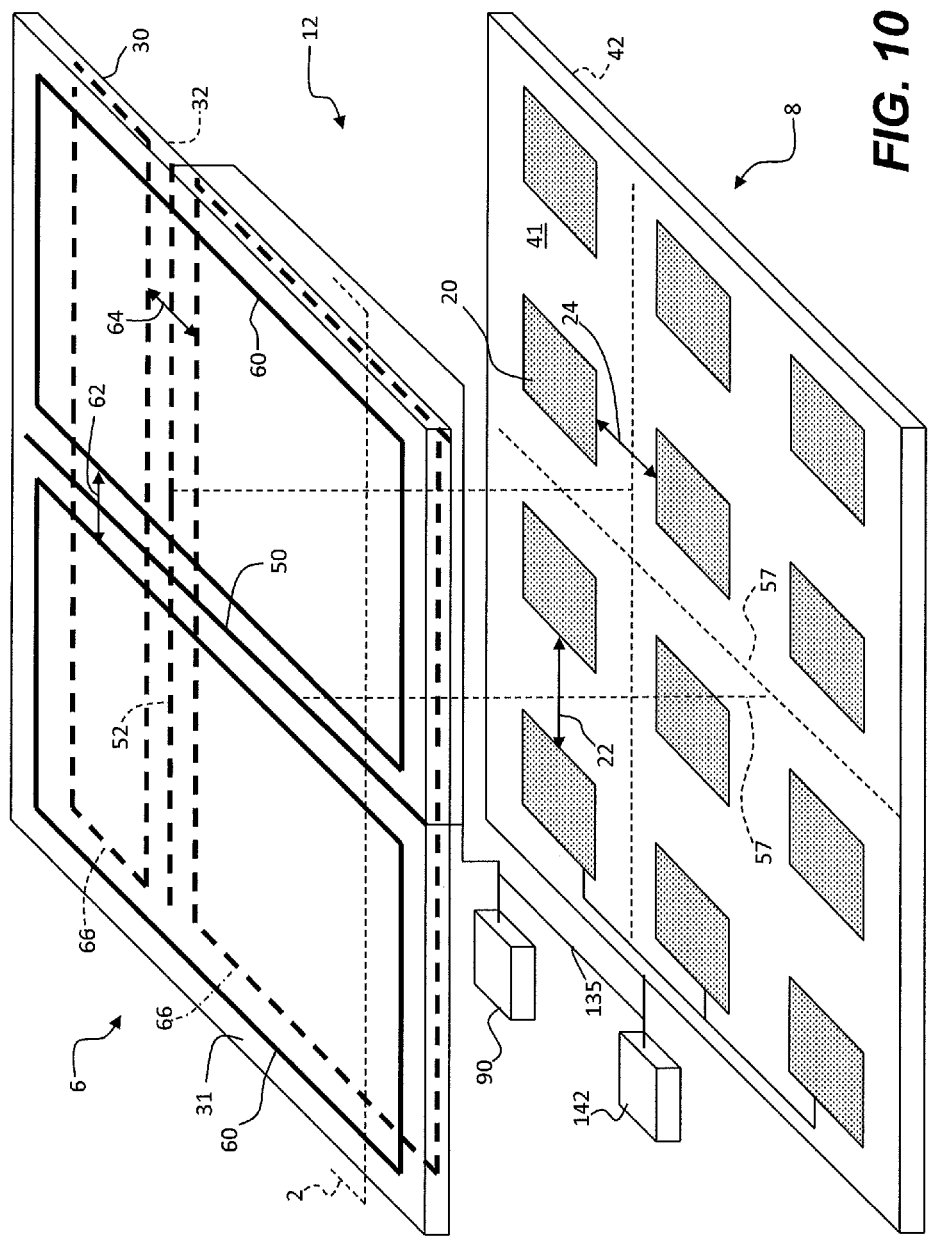
FIG. 10 is an exploded perspective of an embodiment of the present invention.

As shown in FIG. 10, according to another embodiment of the present invention, a display apparatus 12 includes a display 8 including an array of pixels 20 formed in rows and columns. The rows of pixels 20 are separated by row inter-pixel gaps 24 and the columns of pixels 20 are separated by column inter-pixel gaps 22. A touch-screen 6 includes a transparent dielectric layer (electrode substrate 30) having a second electrode substrate side 32 for row electrodes 66 and an opposed first electrode substrate side 31 for column electrodes 60 located over display 8. Touch screen 6 has row electrodes 66 spaced apart by row inter-electrode gaps 64 located on second electrode substrate side 32 of transparent dielectric layer (electrode substrate 30). Column electrodes 60 spaced apart by column inter-electrode gaps 62 are located on the column side of transparent dielectric layer (electrode substrate 30) so that row and column electrodes 66, 60 are separated by the transparent dielectric layer. Row ground lines 52 are located on second electrode substrate side 32 of the transparent dielectric layer between neighboring row electrodes 66 in row inter-electrode gaps 64 and between pixels 20 in a row inter-pixel gap 24. In a further embodiment, column ground lines 50 are located on first electrode substrate side 31 of the transparent dielectric layer in column inter-electrode gaps 62 and between pixels 20 in a column inter-pixel gap 22. In an embodiment, touch screen 6 is a capacitive touch screen.

Pixels 20 can be formed on a first display substrate side 41 of a display substrate 40 opposite a second display substrate side 42 (as shown in FIG. 10). Column ground lines 50 and row ground lines 52 can be electrically connected in common to an electrode control circuit 90 ground line. Electrode control circuit 90 can be a part of a touch screen controller 140

(FIG. 16). Column ground lines 50 and row ground lines 52 can also be electrically connected in common to a display ground, for example controlled by display controller 142 through ground wires 135. Dashed projection lines 57 illustrate the projection of row and column ground lines 52, 50 onto display substrate 40 between pixels 20 in column and row inter-pixel gaps 22, 24 and column and row inter-electrode gaps 62, 64.

Figure 11:
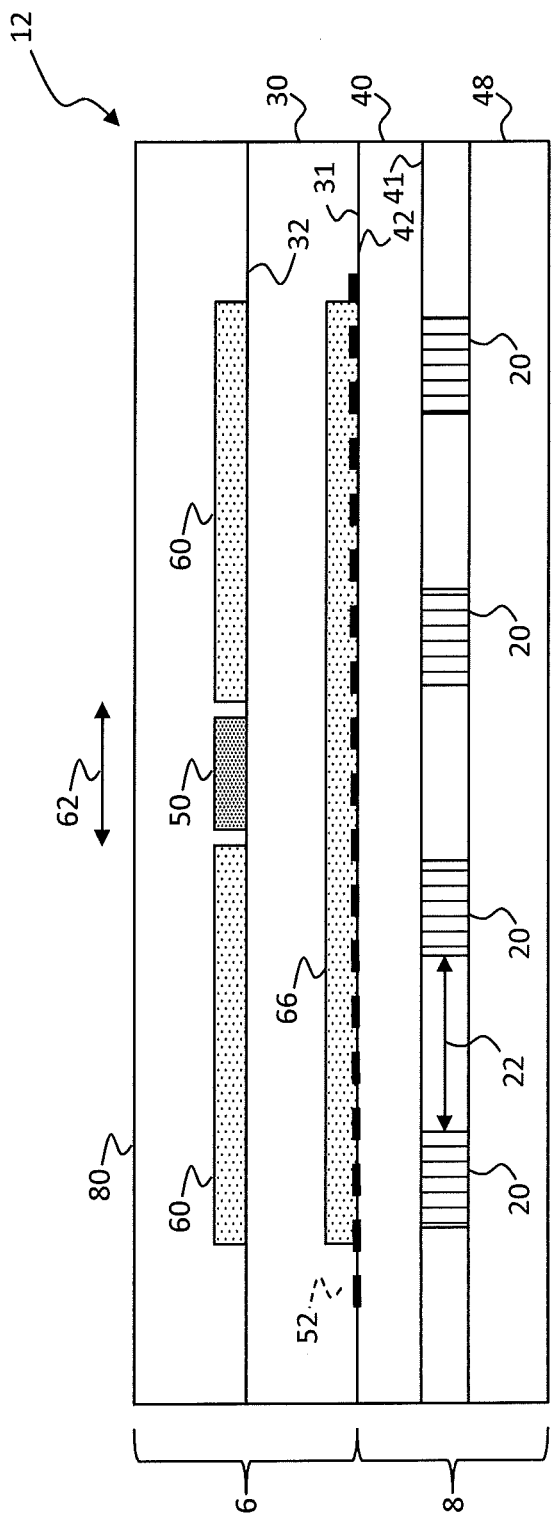
FIGS. 11 and 12 are cross sections of alternative embodiments of the present invention.

Referring to FIG. 11 in a cross section taken through FIG. 10 along cross section line 2, display 8 is formed on a display substrate 40. Display substrate 40 has a first display substrate side 41 on or over which pixels 20 are formed and a second display substrate side 42 opposing first display substrate side 41. A protective display cover 48 can be formed or located over pixels 20 on first display substrate side 41. Row electrodes 66 and row ground lines 52 are formed on or over second display substrate side 42 or on layers formed on second display substrate side 42. Row ground lines 52 are formed between pixels 20 in row inter-pixel gaps 24 (not shown) and row-inter-electrode gaps 64 (not shown). (Row ground lines 52 are not part of the FIG. 10 cross section along line 2, but are indicated with a dashed line to aid understanding.) Transparent dielectric layer (electrode substrate 30) is formed over row electrodes 66 and row ground lines 52. Column electrodes 60 and column ground lines 50 are formed over the transparent dielectric layer. Column ground lines 50 are formed between pixels 20 in column inter-pixel gaps 22 and column inter-electrode gaps 62. A protective layer 80 can be formed or located over column electrodes 60 and column round line 50 to form touch screen 6. Display substrate 40 is between pixels 20 and row electrodes 66. Thus, display 8 is formed on first display substrate side 41 and touch screen 6 is formed on second display substrate side 42 opposite display 8. This arrangement is useful for a bottom-emitter display device.

Figure 12:
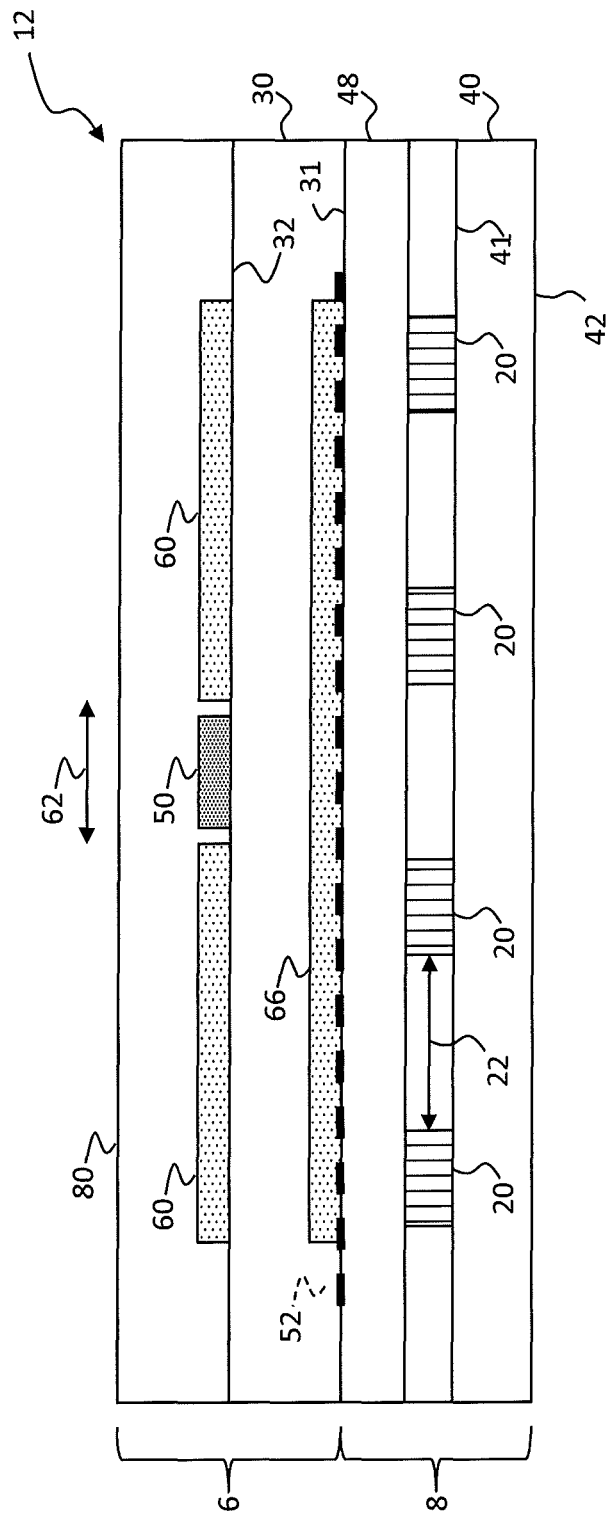

Referring to FIG. 12 in an alternative embodiment, display 8 is formed on a display substrate 40. Display substrate 40 has a first display substrate side 41 on or over which pixels 20 are formed and a second display substrate side 42 opposing first display substrate side 41. Row electrodes 66 and row ground lines 52 are formed on or over first display substrate side 41 or on layers formed or provided on first display substrate side 41, for example display cover 48. Row ground lines 52 are formed between pixels 20 in row inter-pixel gaps 24 and row-inter-electrode gaps 64 (not shown). (Row ground lines 52 are not part of the FIG. 10 cross section along line 2, but are indicated with a dashed line to aid understanding.) Electrode substrate 30 (providing a transparent dielectric layer) is formed over row electrodes 66 and row ground lines 52 and has first and opposing second electrode substrate sides 31, 32. Column electrodes 60 and column ground lines 50 are formed over the transparent dielectric layer. Column ground lines 50 are formed between pixels 20 in column inter-pixel gaps 22 and column inter-electrode gaps 62. A protective layer 80 can be formed or located over column electrodes 60 and column ground line 50 to form touch screen 6. Pixels 20 are between row electrodes 66 and display substrate 40. Thus, display 8 is formed on first display substrate side 41 and touch screen 6 is formed on the same side of display substrate 40. This arrangement is useful for a top-emitter display device.

Referring further to FIGS. 10-12, the transparent dielectric layer is also an electrode substrate 30 having first and second electrode substrate sides 31, 32. Column electrodes 60 and column ground lines 50 are formed on or over second electrode substrate side 32 (or on layers formed on second electrode substrate side 32). Row electrodes 66 and row ground lines 52 are formed on display substrate 40 or display cover 48 (or on layers formed on first display substrate side 41 or display cover 48). Alternatively, row electrodes 66 and row ground lines 52 are formed on or over first electrode substrate side 31 (or on layers formed on first electrode substrate side 31). Display substrate 40 is laminated with electrode substrate 30 to form display apparatus 12 having a display 8 and a touch screen 6. In these arrangements, first electrode substrate side 31 is between electrode substrate 30 and display 8. Thus, in one embodiment, display apparatus 12 is formed by constructing layers over display substrate 40. In another embodiment, layers are separately constructed on each of display substrate 40 and electrode substrate 30 and display substrate 40 and electrode substrate 30 are then laminated together.

Figure 21:
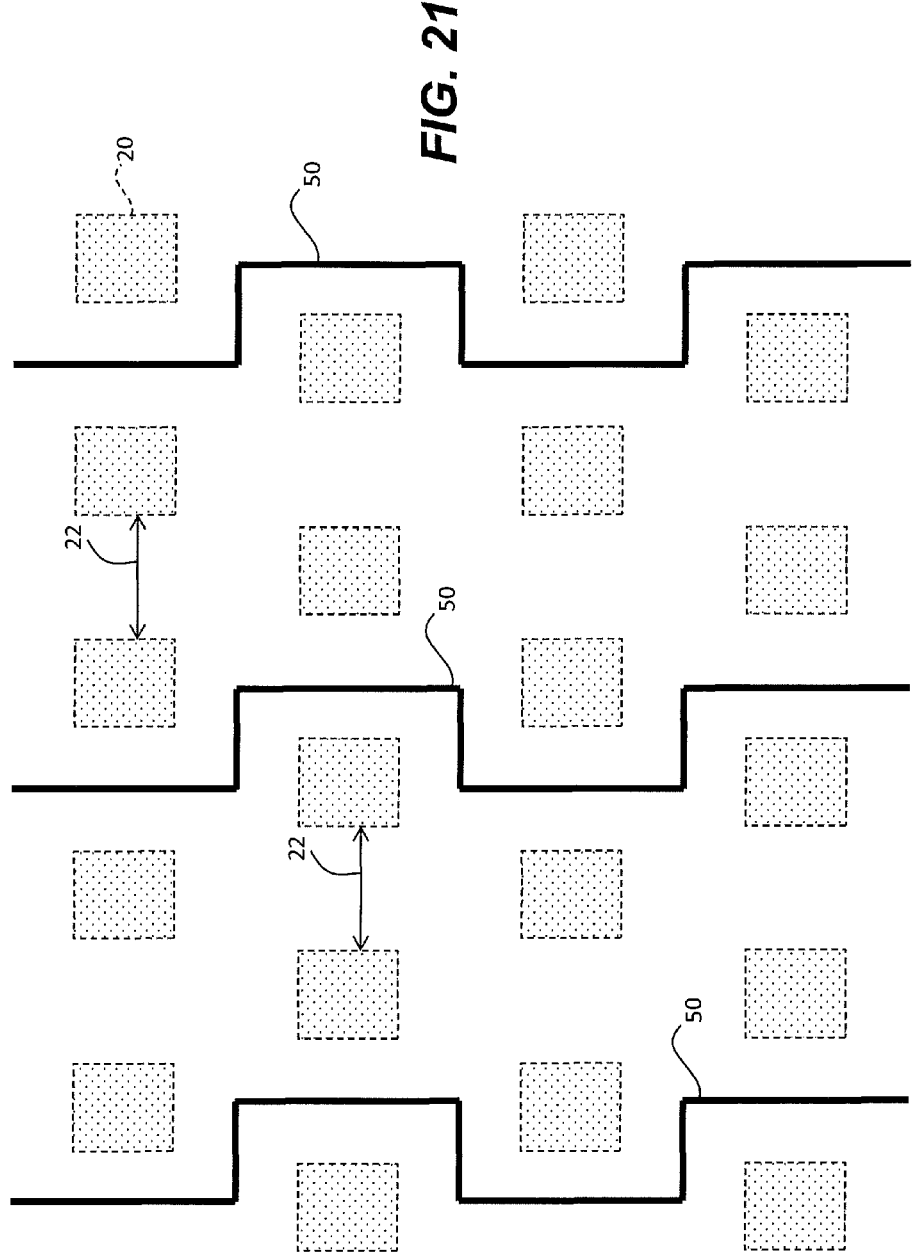
FIG. 21 is a plan view of an embodiment of the present invention.
Figure 22:
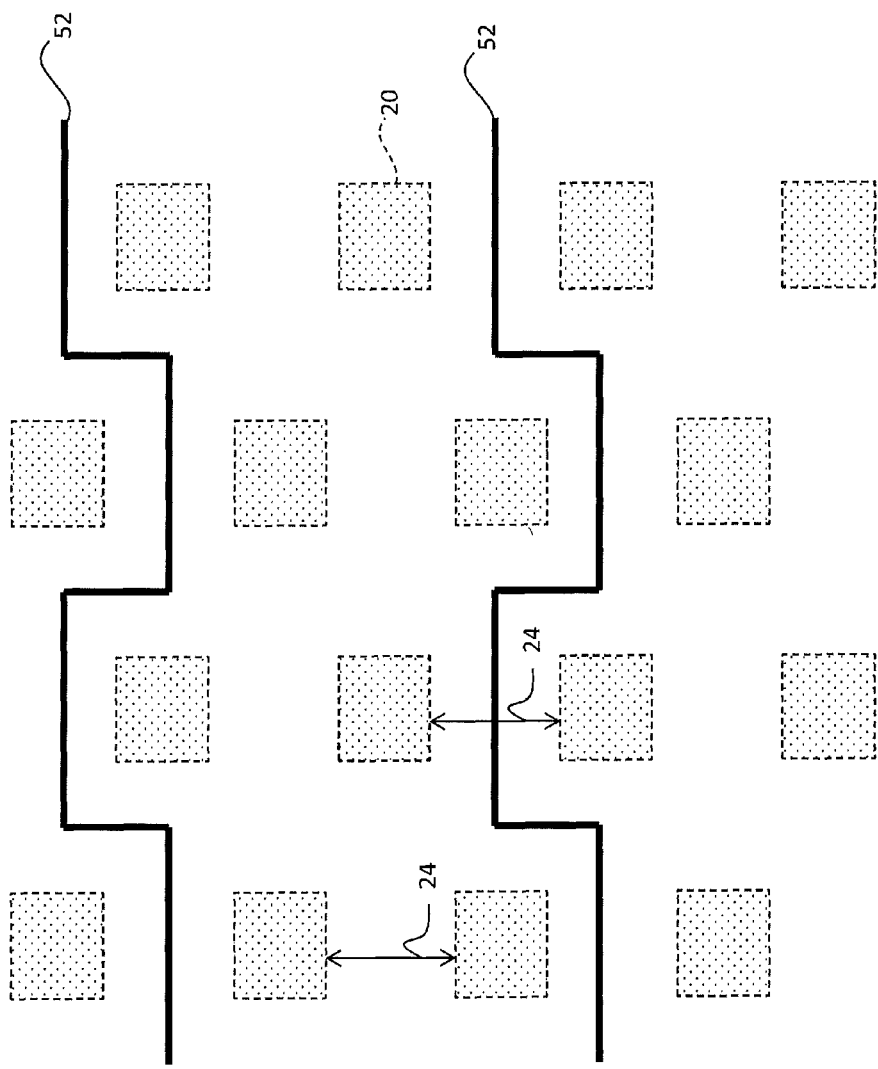
FIG. 22 is a plan view of another embodiment of the present invention.

Row electrode 66 and column electrode 60 can, but need not, form a straight line. In an embodiment, alternating rows of pixels 20 are offset so that the column of pixels 20 does not form a straight line but rather forms a crenellated pattern similar to a square wave. According to an embodiment of the present invention illustrated in FIG. 21, column ground lines 50 formed in column inter-pixel gaps 22 likewise form a crenellated pattern similar to a square wave. Referring to FIG. 22, a similar arrangement is illustrated for offset columns. As illustrated in FIG. 22, alternating columns of pixels 20 are offset so that a row of pixels 20 does not form a straight line but rather forms a crenellated pattern similar to a square wave. According to an embodiment of the present invention, row ground lines 52 formed in row inter-pixel gaps 24 likewise form a crenellated pattern similar to a square wave.

Figure 9:
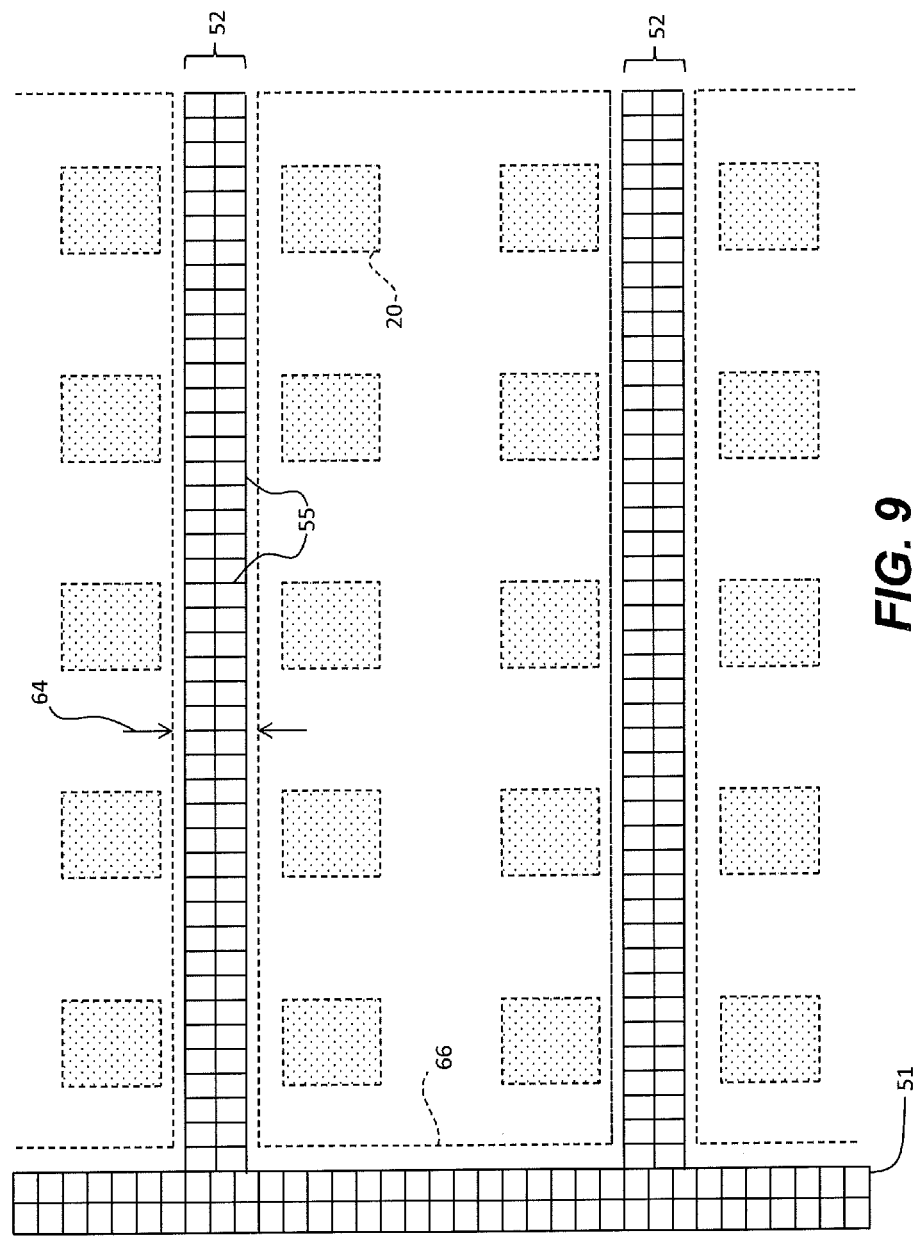
FIG. 9 is a plan view of an embodiment of the present invention having micro-wires.

As noted above with respect to column electrodes 60 and illustrated in FIG. 9, in an embodiment of display apparatus 12, column round line 50 or row ground line 52 (not shown) is a micro-wire 55 or a plurality of electrically connected micro-wires 55, and is partially transparent. A partially transparent column or row ground line 50, 52 can be at least 50% transparent, 80% transparent, 90% transparent, or 95% transparent, depending on a ratio of the micro-wire 55 area to the column or row ground line 50, 52 area. Column or row ground line 50, 52 can include metal or a metal alloy. Column or row ground lines 50, 52 can be electrically connected together and electrically connected to display ground lines or electrode driving circuit ground lines, or both.

Figure 13:
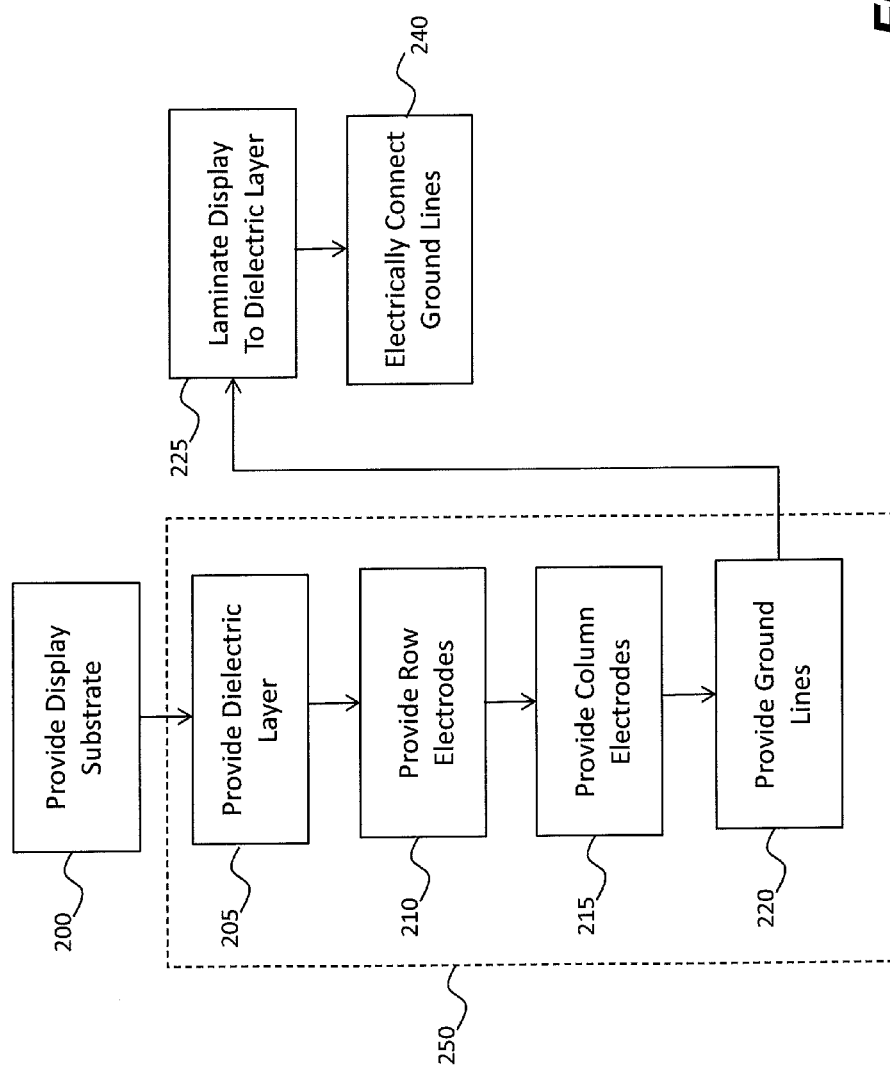
FIGS. 13-15 are flow charts illustrating various methods of the present invention.

Referring to FIG. 13 in a method of the present invention, a display substrate 40 is provided 200 and a transparent dielectric layer (electrode substrate 30) provided 205. Row electrodes 66 are provided 210 and column electrodes 60 are provided 215. Column or row ground lines 50, 52 are provided 220. The transparent dielectric layer (electrode substrate 30) is laminated 225 to display substrate 40 and column or row ground lines 50, 52 electrically connected 240. Steps 205-220 form a step of making 250 a touch screen 6. In general, methods known in the art, for example using photolithography, sputtering, mask exposures of photosensitive coatings, and etching can be used to form pixels 20, column or row electrodes 60, 66, and column or row ground lines 50, 52 on a substrate (e.g. transparent dielectric layer (electrode substrate 30), display substrate 40, or display cover 48). Various elements can be sequentially formed or coated or can be separately provided and located together and the present invention includes both methods. Thus, various elements can be provided, located, or formed; such embodiments are included in the present invention.

Figure 14:
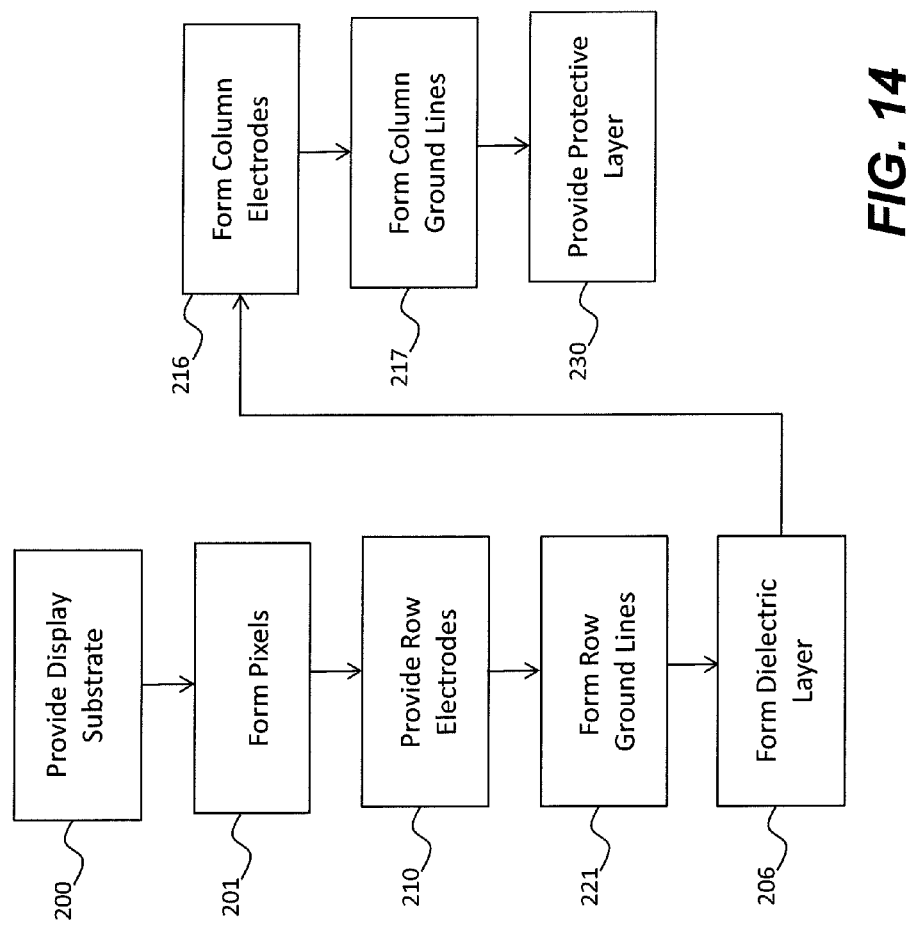

Referring to FIG. 14 in a method of the present invention, a display substrate 40 is provided 200 and pixels 20 formed 201. Row electrodes 66 are provided 210, for example by forming them on a side of display substrate 40 or display cover 48 or on another protective layer. Row ground lines 52 are similarly provided 221 and are formed at the same time or with the same processing step. Transparent dielectric layer (electrode substrate 30) is provided, located, or formed 206 over row electrodes 66 and row ground lines 52. Column electrodes 60 are formed 216 and column ground lines 50 are formed 217 in common or separate steps on transparent dielectric layer (electrode substrate 30). A protective layer 80 is provided, located or formed 230 over or on column electrodes 60 and column ground lines 50.

Figure 15:
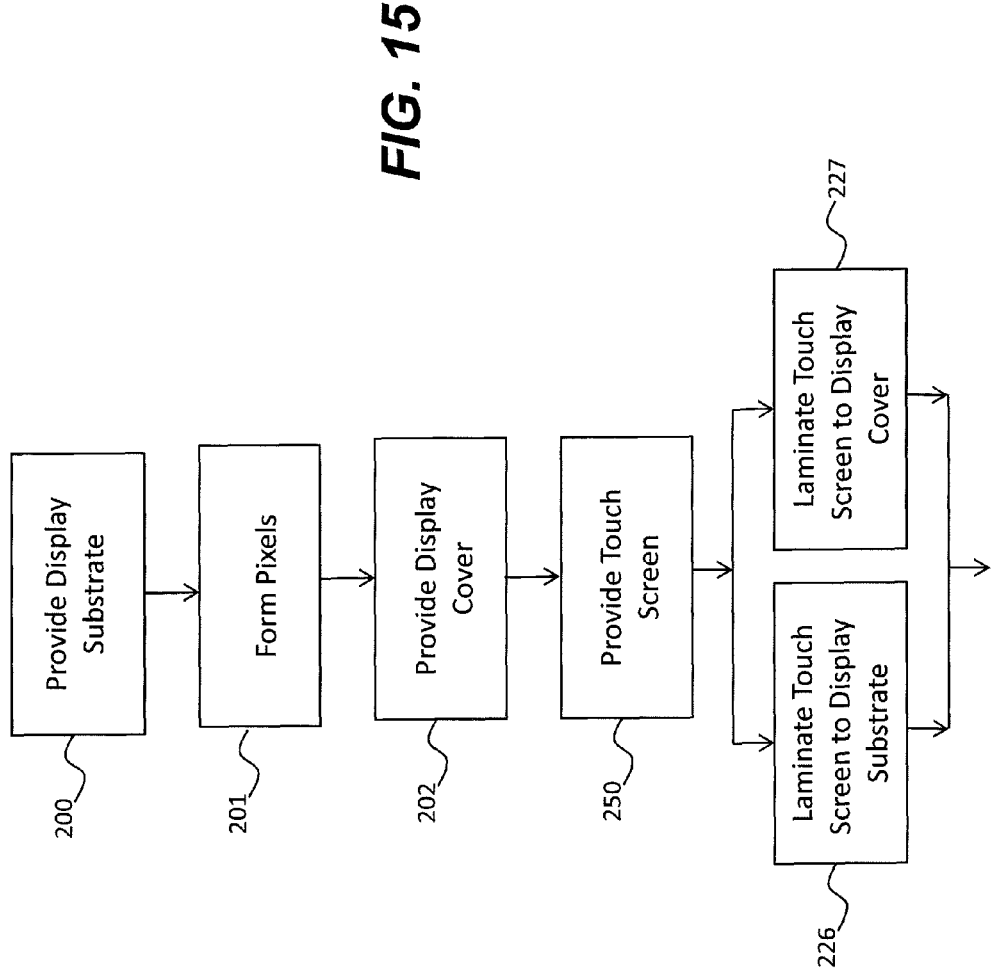

In an alternative method, referring to FIG. 15, a display substrate 40 is provided 200 and pixels 20 formed 201. A display cover 48 is provided 202 over pixels 20. Touch screen 6 is formed and provided 250, for example on a separate electrode substrate 30 (transparent dielectric layer). Touch screen 6 is either laminated 226 to display substrate 40 or laminated 227 to display cover 48.

Those knowledgeable in the manufacturing arts will recognize that various versions of the methods described in FIGS. 13, 14, and 15 can be used and are included in the present invention. For example, row electrodes 66 and row ground lines 52 can be formed on a display cover 48 or display substrate 40; column electrodes 60 and column ground lines 50 are formed on an electrode substrate 30 and electrode substrate 30 laminated to display substrate 40 or display cover 48 over row electrodes 66 and row ground lines 52.

Row electrode 66 and column electrode 60 can, but need not, form a straight line. In an embodiment, alternating rows of pixels 20 are offset so that the column of pixels 20 does not form a straight line but rather forms a crenellated pattern similar to a square wave. According to an embodiment of the present invention illustrated in FIG. 21, column ground lines 50 formed in column inter-pixel gaps 22 likewise form a crenellated pattern similar to a square wave. Referring to FIG. 22, a similar arrangement is illustrated for offset columns. As illustrated in FIG. 22, alternating columns of pixels 20 are offset so that the row of pixels 20 does not form a straight line but rather forms a crenellated pattern similar to a square wave. According to an embodiment of the present invention, row ground lines 52 formed in row inter-pixel gaps 24 likewise form a crenellated pattern similar to a square wave.

The present invention can provide advantages over display-and-touch-screen devices of the prior art. By locating column ground lines 50 between column electrodes 60 or row ground lines 52 between row electrodes 66 in touch screens 6, they reduce electromagnetic interference between display circuits and conductors and touch screen circuits and conductors without interfering with light controlled by pixels 20 in display 8. By forming such column or row ground lines 50, 52 from micro-wires 55, reflectance from the column or row ground lines 50, 52 is reduced so that contrast of display 8 is improved.

As will be readily understood by those familiar with the lithographic and display design arts, the terms row and column are arbitrary designations of two different, usually orthogonal, dimensions in a two-dimensional arrangement of pixels 20 on a surface, for example a substrate surface, and can be exchanged. That is, a row can be considered as a column and a column considered as a row simply by rotating the surface ninety degrees with respect to a viewer. Hence, row electrode 66 can be interchanged with column electrode 60 and column electrode 60 can be interchanged with row electrode 66 depending on the direction of their arrangements on a surface (e.g. a surface of electrode substrate 30 or display substrate 40). Similarly, row and column inter-electrode gaps 64, 62 are designated in correspondence to row and column electrodes 66, 60, as are row and column inter-pixel gaps 24, 22 and can be interchanged. Row electrode 66 and row ground line 52 extend in the arbitrarily selected row direction and column electrode 60 and column ground line 50 extend in the orthogonal column direction.

Display apparatus 12 of the present invention can be operated by using display controller 142 (as shown in FIG. 16) to control display 8 to display information with pixels 20. Touch screen controller 140 (as shown in FIG. 16) provides a voltage differential sequentially to row and column electrodes 66, 60 to scan the capacitance of the capacitor array formed where row and column electrodes 66, 60 overlap. Any change in the capacitance of a capacitor in the array can indicate a touch at the location of the capacitor in the array. The location of the touch can be related to information presented on one or more pixels 20 at the corresponding pixel location to indicate an action or interest in the information present at the corresponding pixel location.

Figure 18:
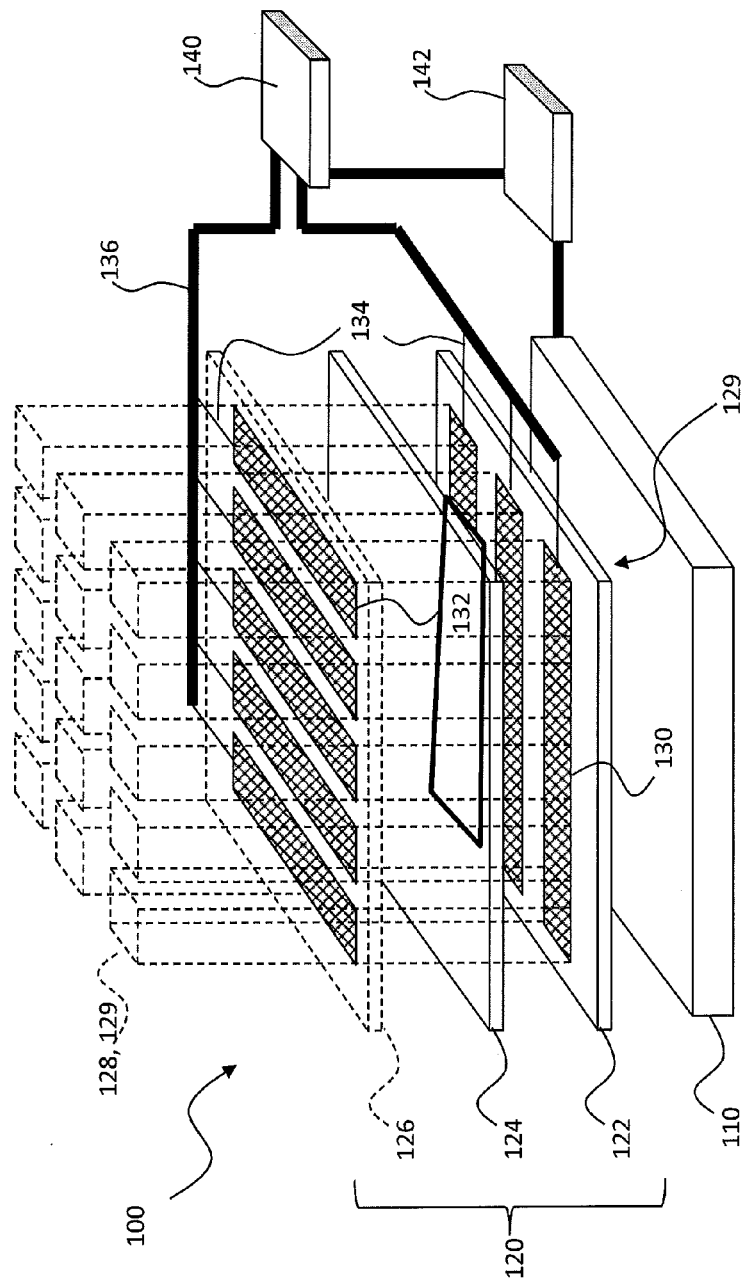
FIG. 18 is an exploded perspective illustrating a prior-art mutual capacitive touch screen having overlapping pad areas in conjunction with a display and controllers.
Figure 19:
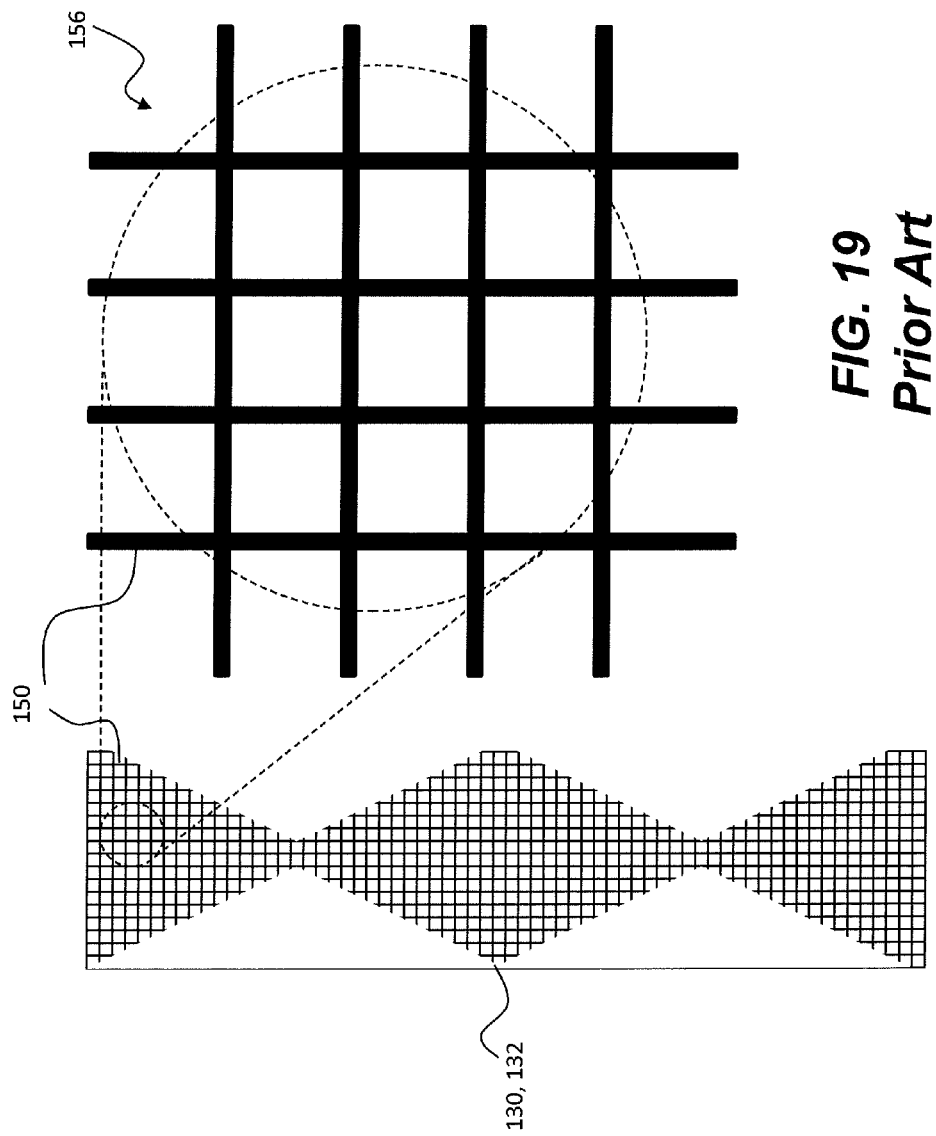
FIG. 19 is a schematic illustrating prior-art micro-wires in an apparently transparent electrode.
Figure 20:
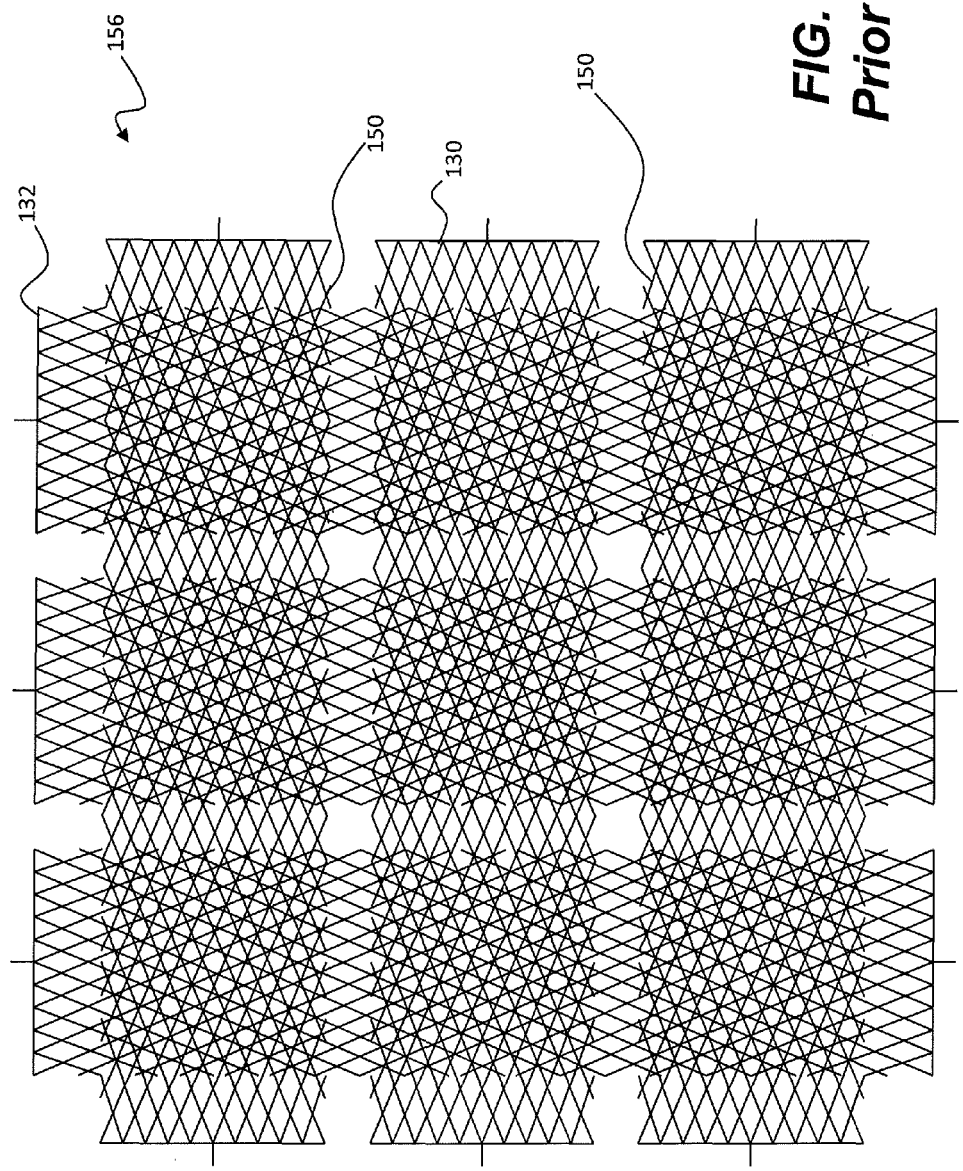
FIG. 20 is a schematic illustrating prior-art micro-wires arranged in two arrays of orthogonal transparent electrodes.

Display device 10 of the present invention can be used in a display apparatus 12 including display 8 and capacitive touch screen 6, as illustrated in the perspective of FIG. 10. Wires 134, buss connections 136, touch-screen controller 140, and display controller 142 of FIG. 16 are used to control and operate the display device 10 of the present invention, as discussed above with respect to FIG. 10. In response to a voltage differential provided by display controller 142 (FIG. 16) between column or row electrodes 60, 66 on either side of transparent dielectric layer (electrode substrate 30), an electrical field is formed and a capacitance produced. Touch-screen controller 140 (FIG. 18) sequentially energizes column or row electrodes 60, 66 and senses a capacitance. The capacitance of overlapping electrode areas is changed in the presence of a conductive element, such as a finger. The change in capacitance is detected and indicates a touch.

In an embodiment, electrode substrate 30 is provided as display cover 48 or display substrate 40.

Substrates of the present invention can include any material capable of providing a supporting surface on which column or row ground lines 50, 52, micro-wires 55, or pixels 20 can be formed and patterned. Substrates such as glass, metal, or plastics can be used and are known in the art together with methods for providing suitable surfaces on the substrates. In a useful embodiment, substrates are substantially transparent, for example having a transparency of greater than 90%, 80% 70% or 50% in the visible range of electromagnetic radiation.

Various substrates of the present invention can be similar substrates, for example made of similar materials and having similar material deposited and patterned thereon. Likewise, column or row electrodes 60, 66 of the present invention can be similar, for example made of similar materials using similar processes.

Electrodes of the present invention can be formed directly on substrates or over substrates on layers formed on substrates. The words "on", "over', or the phrase "on or over" indicate that column or row ground lines 50, 52 or micro-wires 55 of the present invention can be formed directly on a substrate, on layers formed on a substrate, or on other layers or another substrate located so that the column or row ground lines 50, 52 or micro-wires 55 are over the desired substrate. Likewise, column or row ground lines 50, 52 or micro-wires 55 can be formed under or beneath substrates. The words "on", "under", "beneath" or the phrase "on or under" indicate that the column or row ground lines 50, 52 or micro-wires 55 of the present invention can be formed directly on a substrate, on layers formed on a substrate, or on other layers or another substrate located so that the column or row ground lines 50, 52 or micro-wires 55 are under the desired substrate. "Over" or "under", as used in the present disclosure, are simply relative terms for layers located on or adjacent to opposing surfaces of a substrate. By flipping the substrate and related structures over, layers that are over the substrate become under the substrate and layers that are under the substrate become over the substrate. The descriptive use of "over" or "under" do not limit the structures of the present invention.

As used herein, micro-wires 55 are micro-wires formed in a micro-wire layer that forms a conductive mesh of electrically connected micro-wires. If electrode substrate 30 is planar, for example a rigid planar substrate such as a glass substrate, micro-wires 55 in a micro-wire layer are formed in, or on, a common plane as a conductive, electrically connected mesh. If electrode substrate 30 is flexible and curved, for example a plastic substrate, micro-wires 55 in a micro-wire layer are a conductive, electrically connected mesh that is a common distance from a surface of flexible electrode substrate 30. Micro-wires 55 can be formed on electrode substrate 30 or on a layer above (or beneath) electrode substrate 30.

In an example and non-limiting embodiment of the present invention, each micro-wire 55 is 5 microns wide and separated from neighboring micro-wires 55 in column or row ground line 50, 52 by a distance of 50 microns, so that the transparent electrode is 90% transparent. As used herein, transparent refers to elements that transmit at least 50% of incident visible light, preferably 80% or at least 90%. Micro-wires 55 can be arranged in a micro-pattern that is unrelated to the pattern of column or row electrodes 60, 66. Micro-patterns other than those illustrated in the Figures can be used in other embodiments and the present invention is not limited by the pattern of column or row electrodes 60, 66. To achieve transparency, the total area occupied by micro-wires 55 can be less than 15% of the column or row ground line 50, 52 area.

Coating methods for making dielectric layers or protective layers are known in the art and can use, for example, spin or slot coating or extrusion of plastic materials on a substrate, or sputtering. Suitable materials are also well known. The formation of patterned electrical wires or micro-wires 55 on a substrate are also known, as are methods of making displays, such as OLED or liquid crystal, on a substrate and providing and assembling display covers 48 with display substrates 40.

Micro-wires 55 can be metal, for example silver, gold, aluminum, nickel, tungsten, titanium, tin, or copper or various metal alloys including, for example silver, gold, aluminum, nickel, tungsten, titanium, tin, or copper. Other conductive metals or materials can be used. Micro-wires 55 can be made of a thin metal layer. Micro-wires 55 can be, but need not be, opaque. Alternatively, micro-wires 55 can include cured or sintered metal particles such as nickel, tungsten, silver, gold, titanium, or tin or alloys such as nickel, tungsten, silver, gold, titanium, or tin. Conductive inks can be used to form micro-wires 55 with pattern-wise deposition and curing steps. Other materials or methods for forming micro-wires 55 can be employed and are included in the present invention.

Micro-wires 55 can be formed by patterned deposition of conductive materials or of patterned precursor materials that are subsequently processed, if necessary, to form a conductive material. Suitable methods and materials are known in the art, for example inkjet deposition or screen printing with conductive inks. Alternatively, micro-wires 55 can be formed by providing a blanket deposition of a conductive or precursor material and patterning and curing, if necessary, the deposited material to form a micro-pattern of micro-wires 55. Photo-lithographic and photographic methods are known to perform such processing. The present invention is not limited by the micro-wire materials or by methods of forming a pattern of micro-wires 55 on a supporting substrate surface. Commonly-assigned U.S. Ser. No. 13/406,649 filed Feb. 28, 2012, the disclosure of which is incorporated herein, discloses a variety of materials and methods for forming patterned micro-wires on a substrate surface.

In embodiments of the present invention, micro-wires 55 are made by depositing an unpatterned layer of material and then differentially exposing the layer to form the different micro-wire 55 micro-patterns. For example, a layer of curable precursor material is coated over the substrate and pattern-wise exposed. The first and second micro-patterns are exposed in a common step or in different steps. A variety of processing methods can be used, for example photo-lithographic or silver halide methods. The materials can be differentially pattern-wise exposed and then processed.

A variety of materials can be employed to form patterned micro-wires 55, including resins that can be cured by cross-linking wave-length-sensitive polymeric binders and silver halide materials that are exposed to light. Processing can include both washing out residual uncured materials and curing or exposure steps.

In an embodiment, a precursor layer includes conductive ink, conductive particles, or metal ink. The exposed portions of the precursor layer can be cured to form micro-wires 55 (for example by exposure to patterned laser light to cross-link a curable resin) and the uncured portions removed. Alternatively, unexposed portions of micro-wire layers can be cured to form micro-wires 55 and the cured portions removed.

In another embodiment of the present invention, the precursor layers are silver salt layers. The silver salt can be any material that is capable of providing a latent image (that is, a germ or nucleus of metal in each exposed grain of metal salt) according to a desired pattern upon photo-exposure. The latent image can then be developed into a metal image. For example, the silver salt can be a photosensitive silver salt such as a silver halide or mixture of silver halides. The silver halide can be, for example, silver chloride, silver bromide, silver chlorobromide, or silver bromoiodide.

According to some embodiments, the useful silver salt is a silver halide (AgX) that is sensitized to any suitable wavelength of exposing radiation. Organic sensitizing dyes can be used to sensitize the silver salt to visible or IR radiation, but it can be advantageous to sensitize the silver salt in the UV portion of the electromagnetic spectrum without using sensitizing dyes.

Processing of AgX materials to form conductive traces typically involves at least developing exposed AgX and fixing (removing) unexposed AgX. Other steps can be employed to enhance conductivity, such as thermal treatments, electroless plating, physical development and various conductivity-enhancing baths, as described in U.S. Pat. No. 3,223,525.

In an embodiment, precursor material layers can each include a metallic particulate material or a metallic precursor material, and a photosensitive binder material.

In any of these cases, the precursor material is conductive after it is cured and any needed processing completed. Before patterning or before curing, the precursor material is not necessarily electrically conductive. As used herein, precursor material is material that is electrically conductive after any final processing is completed and the precursor material is not necessarily conductive at any other point in the micro-wire formation process.

Methods and devices for forming and providing substrates, coating substrates, patterning coated substrates, or pattern-wise depositing materials on a substrate are known in the photo-lithographic arts. Likewise, tools for laying out electrodes, conductive traces, and connectors are known in the electronics industry as are methods for manufacturing such electronic system elements. Hardware controllers for controlling touch screens and displays and software for managing display and touch screen systems are well known. These tools and methods can be usefully employed to design, implement, construct, and operate the present invention. Methods, tools, and devices for operating capacitive touch screens can be used with the present invention.

Although the present invention has been described with emphasis on capacitive touch screen embodiments, the anisotropically conductive transparent electrodes are useful in a wide variety of electronic devices. Such devices can include, for example, photovoltaic devices, OLED displays and lighting, LCD displays, plasma displays, inorganic LED displays and lighting, electrophoretic displays, electrowetting displays, dimming mirrors, smart windows, transparent radio antennae, transparent heaters and other touch screen devices such as resistive touch screen devices.

The invention has been described in detail with particular reference to certain embodiments thereof, but it will be understood that variations and modifications can be effected within the spirit and scope of the invention.

PARTS LIST

| | |
|---|---|
| 1 | cross section line |
| 2 | cross section line |
| 6 | touch screen |
| 8 | display |
| 10 | display device |
| 12 | display apparatus |
| 20 | pixel |
| 22 | column inter-pixel gap |
| 24 | row inter-pixel gap |
| 30 | electrode substrate |
| 31 | first electrode substrate side |
| 32 | second electrode substrate side |
| 40 | display substrate |
| 41 | first display substrate side |
| 42 | second display substrate side |
| 48 | display cover |
| 50 | column ground line |
| 51 | electrical connector |
| 52 | row ground line |
| 55 | micro-wire |
| 57 | projection line |
| 60 | column electrode |
| 62 | column inter-electrode gap |
| 64 | row inter-electrode gap |
| 66 | row electrode |
| 80 | protective layer |
| 90 | electrode control circuit |
| 100 | touch screen and display apparatus |
| 110 | display |
| 120 | touch screen |
| 122 | first transparent substrate |
| 124 | transparent dielectric layer |
| 126 | second transparent substrate |
| 128 | first pad area |
| 129 | second pad area |
| 130 | first transparent electrode |
| 132 | second transparent electrode |
| 134 | wires |
| 135 | ground wires |
| 136 | buss connections |
| 140 | touch-screen controller |
| 142 | display controller |
| 150 | micro-wire |
| 156 | micro-pattern |
| 200 | provide display substrate step |
| 201 | form pixels step |
| 202 | provide display cover step |
| 205 | provide dielectric layer step |
| 206 | form dielectric layer step |
| 210 | provide row electrodes step |
| 215 | provide column electrodes step |
| 216 | form column electrodes step |
| 217 | form column ground lines step |
| 220 | provide ground line step |
| 221 | form row ground lines step |
| 225 | laminate display to dielectric step |
| 226 | laminate touch screen to display substrate step |
| 227 | laminate touch screen to display cover step |
| 230 | provide protective layer step |
| 240 | electrically connect ground lines step |
| 250 | provide touch screen step |

The invention claimed is:

1. A method of making a display device, comprising:
providing a display substrate having an array of pixels formed in rows and columns, the rows of pixels separated by row inter-pixel gaps and the columns of pixels separated by column inter-pixel gaps;
providing a transparent dielectric layer located over the display substrate, the transparent dielectric layer having a row side and an opposed column side;
providing row electrodes spaced apart by row inter-electrode gaps located on the row side of the transparent dielectric layer and column electrodes spaced apart by column inter-electrode gaps located on the column side of the transparent dielectric layer, the row and column electrodes separated by the transparent dielectric layer; and
providing ground lines located between neighboring row electrodes in the row inter-electrode gaps and between the pixels in a row inter-pixel gap.

2. The method of claim 1, wherein the display substrate has a substantially planar first display substrate side and a substantially planar second display substrate side opposed to the first display substrate side.

3. The method of claim 2, further including forming the pixels on the first display substrate side or on one or more layers on the first display substrate side and forming the row electrodes on the second display substrate side or on one or more layers on the second display substrate side.

4. The method of claim 3, further including forming the transparent dielectric layer over or on the row electrodes.

5. The method of claim 4, further including forming the column electrodes on or over the transparent dielectric layer.

6. The method of claim 4, further including providing a protective layer on or over the column electrodes.

7. The method of claim 2, further including forming the pixels on the first display substrate side or on one or more layers on the first display substrate side and forming the row electrodes on or over the pixels.

8. The method of claim 7, further including forming the transparent dielectric layer over or on the row electrodes.

9. The method of claim 8, further including forming the column electrodes on or over the transparent dielectric layer.

10. The method of claim 9, further including providing a protective layer on or over the column electrodes.

11. The method of claim 1, wherein the ground lines are electrically connected.

12. The method of claim 1, further including forming the row electrodes on the row side of the transparent dielectric layer.

13. The method of claim 1, further including forming the column electrodes on the column side of the transparent dielectric layer.

14. The method of claim 1, further including laminating the transparent dielectric layer to the display substrate.

15. The method of claim 14, further including providing a protective layer with the transparent dielectric layer between the protective layer and the display substrate.

16. The method of claim 1, further including electrically connecting the ground lines on the row side together.

17. The method of claim 1, further including electrically connecting the ground lines on the column side together.

18. The method of claim 1, further including electrically connecting the ground lines on the row side with the ground lines on the column side.

19. The method of claim 1, wherein the transparent dielectric layer is a display cover or display substrate.

20. The method of claim 1, wherein the ground lines include one more electrically connected micro-wires.

21. The method of claim 1, wherein alternating rows or columns of pixels are offset and the ground lines form a crenellated pattern.

* * * * *